(12) United States Patent
Fryer et al.

(10) Patent No.: US 9,140,567 B2
(45) Date of Patent: Sep. 22, 2015

(54) VEHICLE ROUTE CALCULATION

(75) Inventors: Mark Fryer, Christchurch (NZ); Ralph James Mason, Christchurch (NZ); William Elliot, Christchurch (NZ)

(73) Assignee: TELOGIS, INC., Aliso Viejo, CA (US)

( * ) Notice: Subject to any disclaimer, the term of this patent is extended or adjusted under 35 U.S.C. 154(b) by 0 days.

(21) Appl. No.: 13/411,186

(22) Filed: Mar. 2, 2012

(65) Prior Publication Data

US 2012/0226391 A1    Sep. 6, 2012

Related U.S. Application Data

(60) Provisional application No. 61/449,052, filed on Mar. 3, 2011.

(51) Int. Cl.
| | |
|---|---|
| *G06F 7/00* | (2006.01) |
| *G01C 21/34* | (2006.01) |
| *G08G 1/00* | (2006.01) |

(52) U.S. Cl.
CPC .......... *G01C 21/3407* (2013.01); *G08G 1/202* (2013.01)

(58) Field of Classification Search
CPC .......... G08G 1/00; G08G 1/20; G08G 1/202; G01C 1/26; G01C 1/3467
USPC .......... 701/24, 25, 29.3, 32.3, 32.5, 408, 409, 701/410, 411, 424, 454, 460, 461, 482
See application file for complete search history.

(56) References Cited

U.S. PATENT DOCUMENTS

| | | | | |
|---|---|---|---|---|
| 4,750,197 | A | * | 6/1988 | Denekamp et al. ........ 455/404.2 |
| 4,804,937 | A | * | 2/1989 | Barbiaux et al. .............. 340/459 |
| 5,223,844 | A | * | 6/1993 | Mansell et al. .......... 342/357.31 |
| 5,351,052 | A | * | 9/1994 | D'Hont et al. ................... 342/42 |
| 5,987,378 | A | * | 11/1999 | Schipper et al. .............. 701/526 |
| 6,026,345 | A | * | 2/2000 | Shah et al. ..................... 701/117 |
| 6,047,234 | A | * | 4/2000 | Cherveny et al. ............. 701/451 |
| 6,049,754 | A | * | 4/2000 | Beaton et al. ................. 701/465 |
| 6,073,007 | A | * | 6/2000 | Doyle ......................... 455/412.2 |
| 6,381,537 | B1 | | 4/2002 | Chenault et al. |
| 6,718,263 | B1 | | 4/2004 | Glass et al. |
| 6,741,933 | B1 | | 5/2004 | Glass |
| 7,158,879 | B2 | | 1/2007 | Tsuge |
| 7,174,243 | B1 | | 2/2007 | Lightner et al. |
| 7,539,575 | B2 | | 5/2009 | Tada |
| 7,680,749 | B1 | | 3/2010 | Golding et al. |
| 8,275,508 | B1 | | 9/2012 | Adams et al. |
| 8,433,707 | B2 | | 4/2013 | Wallace et al. |

(Continued)

OTHER PUBLICATIONS

International Search Report and Written Opinion for PCT Application No. PCT/US12/27508, mailed Jun. 13, 2012.

(Continued)

*Primary Examiner* — John Q Nguyen
*Assistant Examiner* — Anshul Sood
(74) *Attorney, Agent, or Firm* — Knobbe, Martens, Olson & Bear LLP

(57) ABSTRACT

This disclosure describes vehicle route calculation methods including "fitting" route segments between locations reported by a vehicle at different times along a route to create an overall "fitted" route. In certain embodiments, a vehicle management system generates a vehicle management user interface that displays the "fitted" route overlaid on a map. The "fitted" route can provide more useful tracking information to an administrator compared to simply displaying direct routes between known route stops.

24 Claims, 17 Drawing Sheets

(56) References Cited

U.S. PATENT DOCUMENTS

| | | |
|---|---|---|
| 8,493,207 B2 | 7/2013 | Diem |
| 2006/0085131 A1 | 4/2006 | Yopp et al. |
| 2007/0069923 A1 | 3/2007 | Mendelson |
| 2010/0256863 A1 | 10/2010 | Nielsen |
| 2011/0041088 A1 | 2/2011 | Mason et al. |
| 2011/0241935 A1* | 10/2011 | Miocinovic et al. ..... 342/357.31 |
| 2012/0226391 A1 | 9/2012 | Fryer et al. |
| 2013/0166202 A1 | 6/2013 | Bandyopadhyay et al. |

OTHER PUBLICATIONS

Extended European Search Report, for European Application No. 12752759.6, dated Nov. 20, 2014, in 7 pages.

* cited by examiner

VEHICLE ROUTE CALCULATION

RELATED APPLICATION

This application claims the benefit of priority under 35 U.S.C. §119(e) of U.S. Provisional Patent Application No. 61/449,052, filed on Mar. 3, 2011, entitled "Vehicle Route Interpolation," the disclosure of which is hereby incorporated by reference in its entirety.

BACKGROUND

Specialized fleet management software is often used to manage fleets of vehicles, such as trucks, buses or taxis. Typical fleet management systems include functionality for mapping routes and tracking vehicle's movements. Vehicle tracking is facilitated by communicating with tracking devices installed in vehicles, which typically obtain location and speed information using a global positioning system (GPS). The tracking devices can upload the location and speed information to the fleet management system. In turn, the fleet management system generates a user interface accessible by a fleet administrator or manager to determine vehicle locations, routes, speeds, and so forth.

Some fleet management systems provide historical information about vehicle routes. Such historical information can include start and stop information, vehicle locations at given times, and speed information, or the like. A fleet management system typically outputs this historical information in the form of a list. For example, a fleet management system might provide a map display that includes symbols representing vehicles in a vehicle fleet, and user selection of a vehicle symbol can cause a popup window to display a vehicle history list.

SUMMARY

In certain embodiments, a system for determining an estimated (e.g., most likely) actual route traveled by a fleet vehicle based on historical vehicle status data received from the fleet vehicle at a plurality of time instances including a computer system comprising computer hardware programmed to implement a vehicle route calculation module is provided. The vehicle route calculation module can identify a vehicle in a vehicle fleet and identify a time period of travel of the vehicle. The vehicle route calculation module can also obtain vehicle status information corresponding to telematics data received from the vehicle at a plurality of time instances within the time period of travel and obtain map information comprising road data corresponding to the vehicle position data. The telematics data can include vehicle position data. The vehicle route calculation module can further identify estimated vehicle position locations on roads identified from the road data at a plurality of time instances by comparing characteristics of the vehicle status information with the road data and calculate an estimated (e.g., most likely, lowest cost) actual route traveled by the fleet vehicle between the vehicle position locations.

In certain embodiments, the vehicle route calculation module generates a vehicle management user interface having a map portion and outputs a representation (e.g., a route highlight) of the estimated actual route traveled by the vehicle for presentation on a virtual road map represented in the map portion. The route calculation module can also output the representation of the estimated actual route traveled by the vehicle with an indication reflecting a direction of travel of the vehicle and/or can output the representation of the estimated actual route traveled by the vehicle with an indication reflecting a confidence level in the estimated actual route. The route calculation module can further identify benchmark points from the estimated vehicle position locations and calculate route links between the benchmark points that track actual road segments identified from the road data and then connect the calculated route links to obtain the estimated actual route. The computer system can include a vehicle information server configured to store and output the vehicle status data and a map information server configured to store the map data and to calculate the estimated actual route traveled by the vehicle.

In other embodiments, the vehicle route calculation module does not output a representation of the estimated actual route on a user interface. Thus, the display of the estimated actual route is optional and not required. For example, the vehicle route calculation module can be used to calculate distances driven on different road classes, in different states, or off-road versus on-road. The vehicle route calculation module can also be used to analyze the distance driven by a driver in the course of his/her duties. These calculations could be performed without generating a user interface and without outputting the calculated estimated routes for display. Instead, the calculations can be generated and numerical values or textual strings can be returned or stored in memory, rather than displaying calculated routes on a user interface.

Non-transitory physical computer storage can be provided that includes instructions stored thereon for implementing, in one or more processors, a method of calculating an estimated actual route traveled by a fleet vehicle based on historical vehicle status data at a plurality of time instances. The method can include receiving a user selection of a fleet vehicle and a time period of travel of the fleet vehicle. In response to receiving the user selection, the method can include obtaining vehicle status data over the time period for the fleet vehicle, the vehicle status data being based on telematics data received from the fleet vehicle, and obtaining map data based on the obtained vehicle status data, the map data comprising road information. The method can also include identifying estimated vehicle position locations at a plurality of time instances on roads identified from the road information by comparing characteristics of the vehicle status data with the road information. The method can further include calculating an estimated actual route traveled by the fleet vehicle between the vehicle position locations, wherein the estimated actual route tracks road segments identified from the road information.

Calculating an estimated actual route traveled by the fleet vehicle between the vehicle position locations can include identifying benchmark points from the estimated vehicle position locations and calculating route links between the benchmark points that track actual road segments identified from the road information. Calculating an estimated actual route traveled by the fleet vehicle between the vehicle position locations can also include connecting the calculated route links to obtain the estimated actual route.

The vehicle status data can include location data, time data, speed data, and heading data. The location data can include global positioning system (GPS) data periodically or intermittently received from an in-vehicle GPS device of the fleet vehicle over the time period. The vehicle status data can be periodically received at a time interval (e.g., between thirty seconds and three minutes, one minute, two minutes).

A vehicle route highlighting user interface for facilitating calculation and display of historical route information for one or more fleet vehicles can include a map portion configured to display calculated routes of the one or more fleet vehicles represented on a road map of an area traveled by the one or more fleet vehicles. The calculated routes can track road segments of the road map identified based upon a comparison of characteristics of vehicle status information corresponding to telematics data received from in-vehicle devices of the one or more fleet vehicles with road data obtained from road map information. The user interface can also include a vehicle history timeline portion that displays vehicle status information in a visible format for a user. The map portion and the vehicle history display portion can be configured to be generated by a computer system comprising computer hardware.

The calculated routes can be displayed on the road map with a direction of travel indication. The direction of travel indication can be a virtual representation of motion of the displayed calculated routes in the direction of travel. The calculated routes can also be displayed with a confidence indication. The confidence indication can vary along each displayed calculated route depending on the level of confidence at various portions of the displayed route. The confidence indication can include a coloring indication, an alphanumeric indication (e.g., a percentage value or a textual label), a graphical icon, and/or the like.

The systems and methods described herein can be implemented by a computer system comprising computer hardware. The computer system may include one or more physical computing devices, which may be geographically dispersed or co-located.

Certain aspects, advantages and novel features of the inventions are described herein. It is to be understood that not necessarily all such advantages may be achieved in accordance with any particular embodiment of the inventions disclosed herein. Thus, the inventions disclosed herein may be embodied or carried out in a manner that achieves or selects one advantage or group of advantages as taught herein without necessarily achieving other advantages as may be taught or suggested herein.

BRIEF DESCRIPTION OF THE DRAWINGS

The features of embodiments of the inventions disclosed herein are described below with reference to the drawings. Throughout the drawings, reference numbers are re-used to indicate correspondence between referenced elements. The drawings are provided to illustrate embodiments of the inventions described herein and not to limit the scope thereof.

DETAILED DESCRIPTION

I. Introduction

Figure 1:
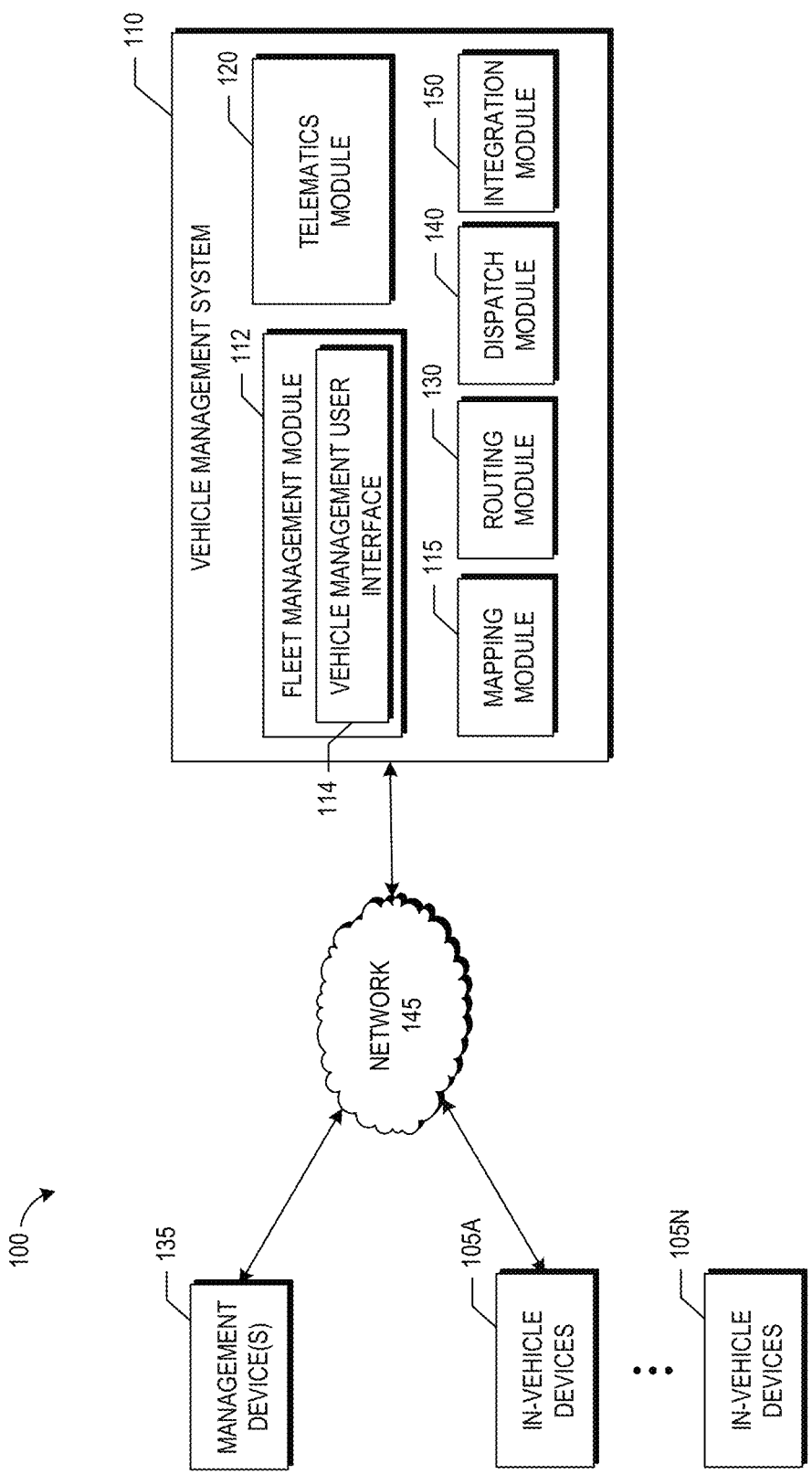
FIG. 1 illustrates an embodiment of a vehicle management system.

Fleet administrators or managers typically desire quick and easy visualization of the performance of fleet vehicles at their convenience and according to their desired specifications. The visualization can be accomplished by displaying historical and/or real-time vehicle status and/or route information on a user interface. For example, the display of representations of the fleet vehicles and/or display of the routes traveled or being traveled by the fleet vehicles on a map can provide an easy way for a fleet administrator to quickly scan the routes that have been traveled or are currently being traveled by the fleet vehicles and identify potential matters of concern.

The displayed routes can be generated (e.g., calculated) based on telematics information received at various time instances (e.g., periodic or intermittent time intervals) from in-vehicle devices. The telematics information can include location or position information (e.g., as obtained by a GPS unit) and time information. An additional benefit can be achieved to improve accuracy of the displayed routes traveled by the vehicles by including direction of travel, or heading, information, speed of travel information, driver identification information, and/or the like in the telematics information.

If the telematics information could be received continuously by the fleet management system, then the actual routes traveled by the vehicles could be determined and displayed with high positional resolution, and therefore high precision. However, continuous receipt of telematics information is typically not possible due to data transfer costs, speed, and/or other limitations. Accordingly, in some embodiments, the telematics information is received at periodic time intervals (e.g., every two minutes, every minute, every five minutes) from in-vehicle devices (e.g., GPS units) of the fleet vehicles. Because the telematics information is received at spaced-apart time instances, the actual route traveled cannot be known with a high degree of certainty at every instant of time. Advantageously, this disclosure describes route calculation, or fitted history, methods for vehicle management systems that, in certain embodiments, interpolate, or fit, route segments or links between known road locations (e.g., route stops) when actual routes traveled are not known. The methods described herein can use the known road locations as benchmark points and calculate intermediate locations determined by correlating the historical telematics data with the mapping data to facilitate the route calculation process.

In accordance with several embodiments, the methods described herein can advantageously correlate mapping information (e.g., road network information) and historical vehicle position information (e.g., telematics information, such as position, time stamp, speed, and heading information) reported at spaced-apart time instances for a vehicle to provide a more intelligent display of where the vehicle is most likely to have been travelling at any given time. For example, the methods described herein can infer a route taken by comparing the characteristics of a GPS data point identified from the vehicle status information to underlying map data identified from the mapping information to make intelligent decisions with respect to the most likely path rather than simply "connecting the dots" with straight lines or snapping to nearest road segments.

In accordance with several embodiments, the methods described herein determine position locations on actual roads identified from the mapping information based on the vehicle status information (e.g., position information, time information, speed information, heading information) and generate route segments, or links, that track actual road segments between the determined position locations. The route links can then be connected to construct an overall estimated vehicle route that can be virtually displayed as an overlay on a road map of a user interface. Accordingly, the methods described herein generate route segments or links that can be displayed to track roads on a road map rather than simply displaying straight lines between reported vehicle locations.

In certain embodiments, a vehicle management system generates a vehicle management user interface that displays the fitted routes for viewing by management personnel or others. The routes displayed can represent the most likely route between location points received at different times for a particular vehicle. Calculated historical routes can be displayed for a plurality of vehicles on a map portion of a vehicle management user interface. The displayed routes on the user interface provide an easy way for a fleet administrator to quickly scan the routes to see the likely actual routes traveled by the vehicles. In some embodiments, the calculated actual routes can be compared to predetermined assigned routes to identify aberrations, abnormalities, inefficiencies, driver misbehavior, and/or the like. In some embodiments, the route construction and/or route calculation methods described herein can advantageously compensate for inaccuracies in the telematics information (e.g., GPS position information) received by the fleet management system.

The features described herein may also be implemented for non-fleet vehicles, such as for personal vehicle navigation systems. However, for ease of illustration, the remainder of this disclosure will describe vehicle management systems in the context of vehicle fleets, such as fleets of service vehicles, delivery vehicles, passenger transportation vehicles, trucks, taxis, buses, trains, planes, boats, emergency vehicles, other vehicles, and the like.

II. Vehicle Management System

FIG. 1 illustrates an embodiment of a computing environment 100 for implementing a vehicle management system 110. Among other features, the example vehicle management system 110 shown can generate a vehicle management user interface that displays calculated historical routes displayed on a map portion of the user interface and vehicle history timelines displayed on a history portion of the user interface.

In the computing environment 100, one or more in-vehicle devices 105A . . . 105N and management devices 135 communicate with the vehicle management system 110 over a network 145. The in-vehicle devices 105 can include computing devices installed in fleet vehicles. These devices 105 can include navigation functionality, routing functionality, and the like. The in-vehicle devices 105 can receive route information and other information from the vehicle management system 110. In addition, the in-vehicle devices 105 can report information to the vehicle management system 110, such as driver and/or vehicle location, vehicle sensor data (including speed and heading information), and so forth. In some embodiments, the in-vehicle devices are portable devices that can be removed from the vehicle and/or transferred between vehicles. In some embodiments, the in-vehicle devices comprise GPS units that include one or more receivers, transmitters, or transceivers.

The management devices 135 can be computing devices used by dispatchers, administrators, or other users to manage different aspects of the vehicle management system 110. For example, a user of a management device 135 can access the vehicle management system 110 to dispatch vehicles and drivers and perform other fleet management functions. With the management devices 135, users can access and monitor vehicle information obtained from the in-vehicle devices 105 by the vehicle management system 110. Such information can include data on vehicle routes used, stops, speed, direction of travel, vehicle feature usage (such as power takeoff device usage), driver behavior and performance, vehicle emissions, vehicle maintenance, energy usage, and the like. In some embodiments, the management devices 135 are located at a dispatch center. The management devices 135 can also be used by administrators in the field, and may include mobile devices, laptops, tablets, smartphones, personal digital assistants (PDAs), desktops, or the like.

The vehicle management system 110 can be implemented by one or more physical computing devices, such as servers. These servers can be physically co-located or can be geographically separate, for example, in different data centers. The one or more physical computing devices can be communicatively coupled via a wired or wireless network (e.g., shared computing or cloud computing network). The vehicle management system 110 can comprise a fleet management software platform. In the depicted embodiment, the vehicle management system 110 includes a fleet management module 112, a mapping module 115, a telematics module 120, a routing module 130, a dispatch module 140, and an integration module 150.

Figure 1A:
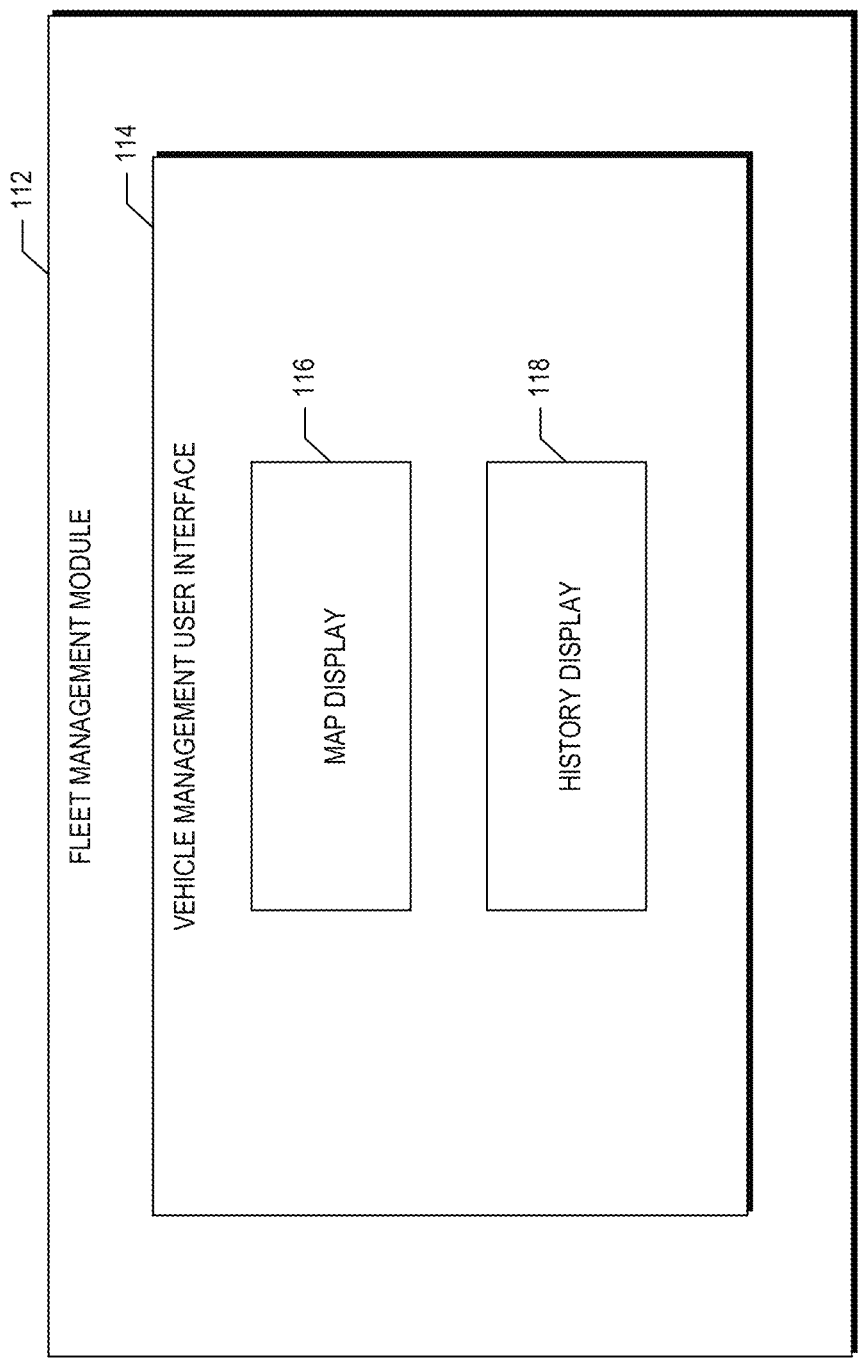
FIG. 1A illustrates an embodiment of a fleet management module of the vehicle management system of FIG. 1.

The fleet management module 112 can include functionality for generating a vehicle management user interface 114. With reference to FIG. 1A, the vehicle management user interface 114 can include a map display 116 or list of vehicles that depicts symbols or other data representative of vehicles. Calculated historical routes for one or more vehicles determined by the route fitting or route calculation methods described herein can be output to the map display 116 for display to a user. In addition, the vehicle management user interface 114 can include a history timeline display 118. For example, in response to user selection of one or more of the vehicle symbols from the map or list, the vehicle management user interface 114 can output one or more vehicle history timelines corresponding to the selected vehicle or vehicles. Advantageously, the history timeline display 118 can provide multiple vehicle histories correlated in time, thereby allowing comparison of events among vehicles. Viewed another way, the vehicle history timelines can also be considered driver timelines. In some embodiments, the history timeline display is optional.

Example vehicle management user interfaces 114 are described below in detail with respect to FIGS. 3 through 5. Although the fleet management module 112 generates the user interface 114, in certain embodiments the fleet management module 112 outputs the user interface 114 to the management devices 135, which actually display the user interface 114.

The fleet management module 112 can communicate with the mapping module 115 to obtain mapping data, which the fleet management module 112 can include in the vehicle management user interface 114 on the map display portion 116. The mapping module 115 can be a geographic information system (GIS) in one embodiment comprising one or more servers. The fleet management module 112 can also access the telematics module 120 to obtain vehicle status data for inclusion in vehicle history timelines and for use in the route fitting, route calculation, or route determination methods described herein. The telematics module 120 can provide this vehicle status data based on telematics data obtained from the in-vehicle devices 105N. The telematics data can include such data as location or speed information obtained using GPS or cellular tower triangulation (or other methods), vehicle sensor data, and so forth. In some embodiments, the telematics data is sent over a mobile cellular telecommunications network. The telematics data is described below in greater detail with respect to FIG. 2.

The routing module 130 can calculate and construct routes for vehicles based on any of a variety of routing algorithms, such as those disclosed in U.S. Publication No. 2010/0153005, filed Dec. 8, 2009, and entitled "System and Method for Efficient Routing on a Network in the Presence of Multiple-Edge Restrictions and Other Constraints," the disclosure of which is hereby incorporated by reference in its entirety. In addition, the routing module 130 can generate, or calculate, a most likely, or most probable, actual route traveled by one or more vehicles over a particular timespan. As described in greater detail herein, the most likely, or most probable, actual routes can be generated by the routing module 130 based on position and time data for a plurality of reported locations in combination with road network data received from the mapping module 115. In some embodiments, other vehicle status data can optionally be used (e.g., vehicle speed data, vehicle heading data, historical route data based on similar or the same routes traveled in the past, historical driver data, and/or the like). The vehicle status data can be the telematics data received from fleet vehicles or it can be generated from the telematics data (depending on what format the telematics data is received). For example, if the telematics data is represented as digital data, the digital data can be converted to another form (such as alphanumeric data or textual strings to facilitate processing by software applications or to provide a more human-readable format).

The integration module 150 can facilitate integration of the vehicle management system 110 with other systems, such as fuel card systems, payroll systems, supply chain system, insurance systems, and the like. The dispatch module 140 can provide functionality for users of the management devices 135 to assign drivers and vehicles to routes selected by the routing module 130. Furthermore, although not shown, the vehicle management system 110 may include functionality for disabling an engine remotely to recover a stolen vehicle (as permitted in Europe and some other areas).

The illustrated network 145 may be a LAN, a WAN, the Internet, a shared computing network (e.g., cloud computing network), combinations of the same, or the like. For ease of illustration, the vehicle management system 110 has been depicted as a centralized system. However, in other implementations, at least some of the functionality of the vehicle management system 110 is implemented in other remote devices. Other possible implementations of the vehicle management system 110 can include many more or fewer components than those shown in FIG. 1. In some embodiments, the vehicle management system 110 comprises a Software-as-a-Service (SaaS) GPS fleet management system.

III. Route Construction and Display

Figure 2:
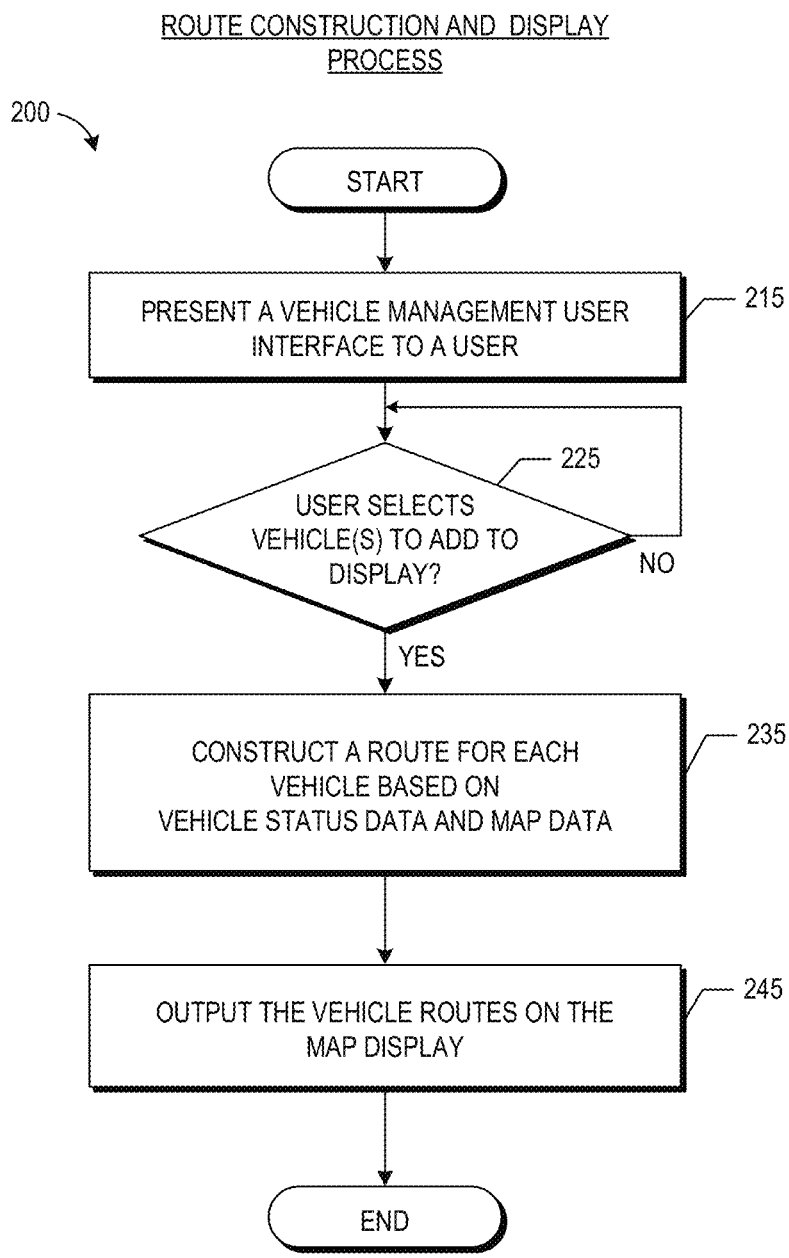
FIG. 2 illustrates an embodiment of a route history display process that can be implemented by the vehicle management system of FIG. 1.

With reference to FIG. 2, an embodiment of a route construction and display process 200 is illustrated. The route construction and display process 200 can be implemented by the vehicle management system 110. In particular, the route construction and display generation process 200 can be implemented by the fleet management module 112. In certain embodiments, the route construction and display process 200 advantageously generates fitted or calculated routes for display on the vehicle management user interface 114. The route construction and display process 200 will be described in the context of FIGS. 3 and 4, which include examples of vehicle management user interfaces.

At block 215 of FIG. 2, a vehicle management user interface is presented to a user. The user may be an administrator or other user of the management devices 135 described above. The vehicle management user interface may be presented to the user in response to the user requesting access to the vehicle management user interface. For instance, in one embodiment, the user accesses a browser or other network application software installed on a management device 135, which accesses the vehicle management user interface 114 from the vehicle management system 110. The vehicle management user interface 114 can therefore run in a browser, for example, as a web page or the like. The vehicle management user interface 114 could run instead in an application other than a browser in other embodiments.

Figure 3:
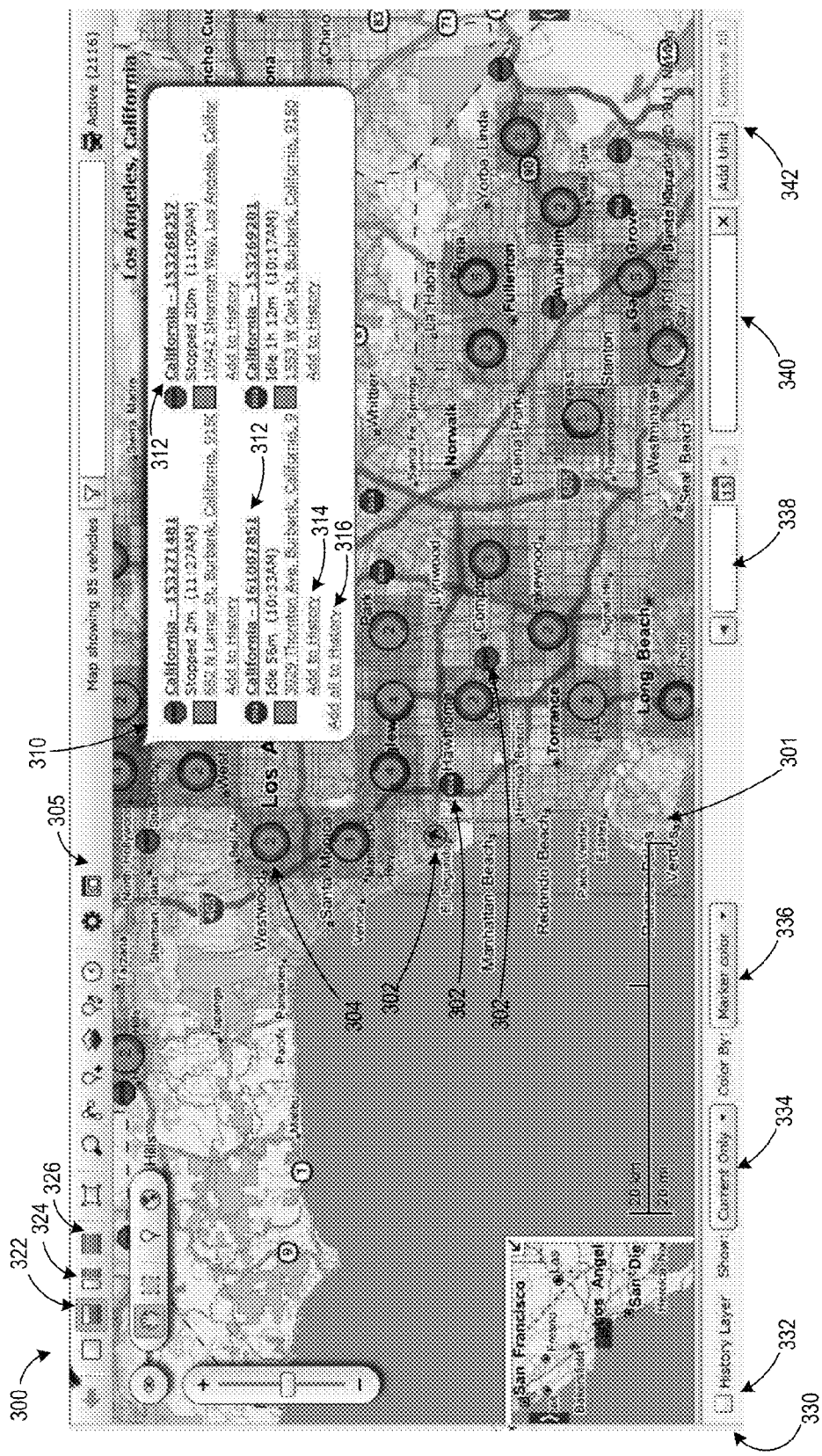
FIGS. 3-5 illustrate embodiments of user interfaces associated with vehicle history displays that can be generated by the vehicle management system of FIG. 1.

Turning to FIG. 3, an example vehicle management user interface 300 is shown. The vehicle management user interface 300 includes a map 301 having various symbols 302, 304 that represent vehicles. Two main types of vehicle symbols 302, 304 are shown to represent single vehicles and groups or clusters of vehicles. The symbols 302 can include green arrows to indicate movement of a vehicle, blue idle signs to indicate a vehicle that is idling, and red stop signs that indicate vehicles that have stopped. These symbols are merely illustrative examples and can be varied in other embodiments. The symbols 304, in contrast, represent groups or clusters of vehicles. If a user were to zoom in on a cluster 304, the cluster could expand to show individual vehicles (or smaller clusters, should the original cluster 304 represent a large number of vehicles). The vehicle management user interface 300 can therefore incorporate the clustering features described in detail in U.S. application Ser. No. 12/882,930, filed Sep. 15, 2010, and entitled "Real Time Map Rendering With Data Clustering and Expansion and Overlay," the disclosure of which is hereby incorporated by reference in its entirety. Clusters need not be used to represent groups of vehicles, however.

User selection of an individual vehicle symbol 302 or cluster 304 can cause the vehicle management user interface 300 to produce a popup box 310 displaying certain vehicle status information. The example vehicle status information shown in the popup box 310 includes vehicle identifiers 312, addresses of current locations, icons representing the current status of the vehicles (such as green boxes to represent moving, stop signs for stopped vehicles, idle signs etc.). Further, the popup box 310 includes links 314, 316 for adding one or more vehicles to a history display. Selection of the link 314, which says "Add to History" underneath a specific vehicle identifier 312, can add an individual vehicle to a history display. Selection of the link 316, which says "Add all to history," can add all the vehicles shown in the box 310 and corresponding to the selected cluster 304 to a history display.

Figure 4:
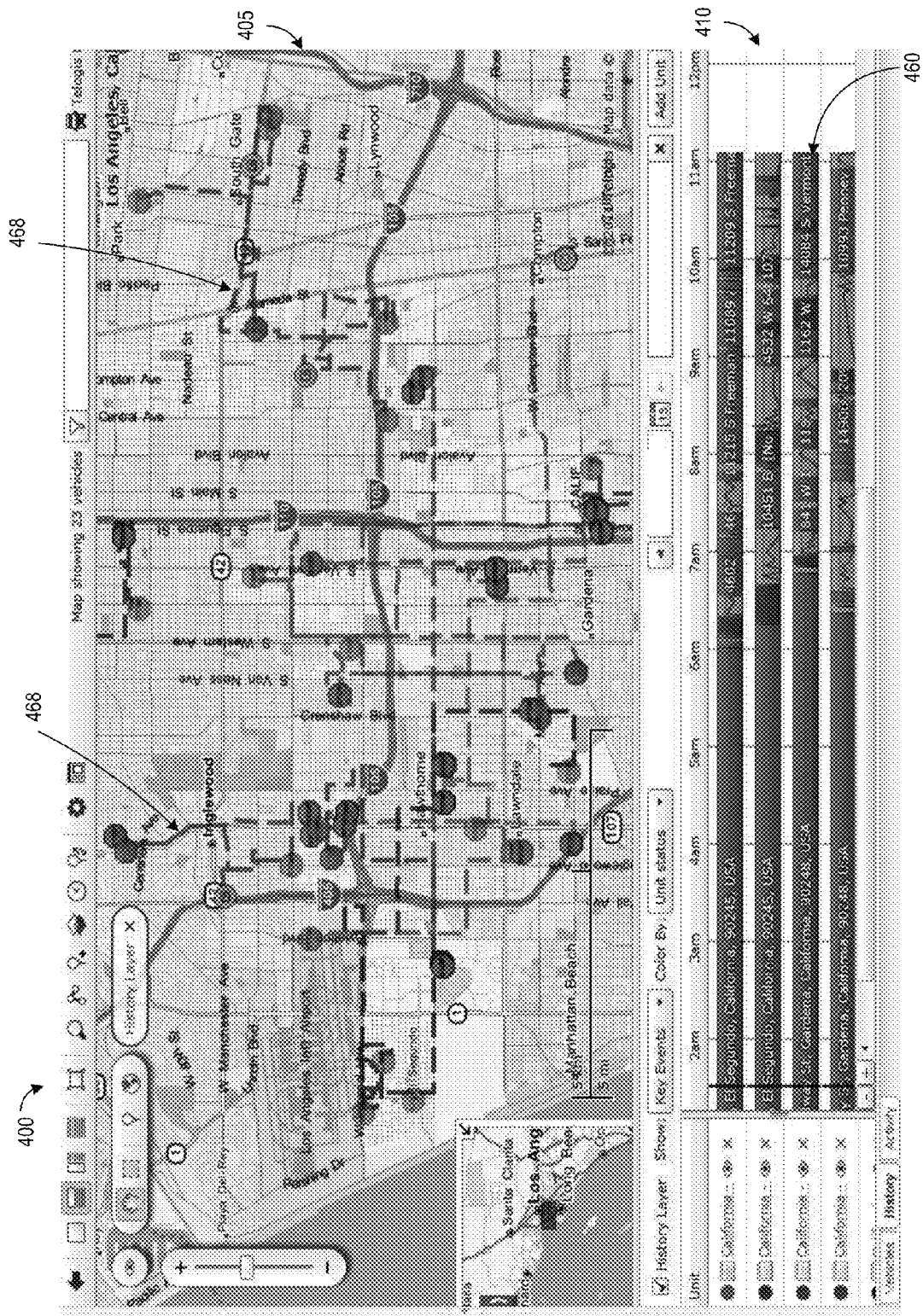

A history timeline display is not shown in FIG. 3 but can be generated from the vehicle management user interface 300 shown in FIG. 3 (see FIG. 4). Toolbars 305, 330 are included as examples of user interface controls that can be used to manage history timeline displays 118. For example, in the toolbar 330, another way to select vehicles to add to a history display 118 is to enter the name of the vehicle in a text box 340 and select an "add unit" button 342. A date for which history can be displayed is also selectable via control 338 in the toolbar 330. Further, the toolbar 330 includes a checkbox control 332 for toggling the history display or history layer. A select box 334 allows current data, key data, and/or all vehicle status data to be displayed on a history timeline. A select box 336 allows different types of timelines to be generated (see below). On the toolbar 305, different buttons 322, 324, and 326 enable different formats for the history display, such as in a frame below the map 301, in a frame to the right (or left) of the map 301, or as a list independent of the map 301. Further, the history display 118 can be provided in a separate window. The history display 118 is optional in some embodiments.

Referring again to FIG. 2, it is determined at decision block 225 whether a user has selected one or more vehicles to add to a display. If the user has not made a selection, the process 200 continuously loops until a selection is performed. Thus, for example, a display of history timelines or constructed routes could be generated in one embodiment if one of the links 314, 316 of FIG. 3 were selected. If the user does select a vehicle or vehicles, at decision block 225, the route construction and display process 200 proceeds to block 235. In addition to selecting one or more vehicles, the user can also specify a time period, or time span, for which the user wants historical routes to be calculated and displayed. The time period can be a matter of days, a matter of hours, a matter of minutes, etc. For example, the user can specify a start time and a stop time or a start time and a desired duration.

At block 235, the fleet management module 112 constructs a route for each vehicle selected based on vehicle status data corresponding to the selected vehicle and time period. The vehicle status data can be obtained or accessed from the telematics module 120 and can correspond to the telematics data received from the in-vehicle devices 105N. Telematics data can include raw sensor data obtained from vehicles, such as engine sensor data (which can reflect whether the vehicle is running, idling or turned off), power takeoff device data, and the like. Further, the telematics data can include raw GPS data (such as latitude and longitude data).

The telematics module 120 can translate this telematics data into the vehicle status data (which may be more human-readable or in a better format for processing by computing applications and algorithms). For instance, the telematics module 120 can translate engine sensor data into information regarding vehicle stop and idle times, speed data, and information regarding whether a power takeoff device (such as a hydraulic lift) was in use while an engine was running. As another example, the telematics module 120 can access the GIS software of the mapping module 115 to translate GPS or cellular triangulation data to street address information (e.g., via reverse geocoding). In other embodiments, however, the in-vehicle devices themselves can translate the telematics data into the vehicle status data.

As described above, the telematics data can include position information, speed information, and heading information. As described above, the telematics data can be received from the in-vehicle devices at periodic time intervals, such as several seconds apart (e.g., ten to fifty seconds, fifteen to forty-five seconds, twenty to sixty seconds, thirty seconds, or overlapping ranges thereof) or a few minutes apart (e.g., one to ten minutes, three to fifteen minutes, one, minute, two minutes, three minutes, four minutes, five minutes, or overlapping ranges thereof) as desired based on a cost, speed and accuracy tradeoffs, for example.

The time intervals can be fixed or variable. In some embodiments, the time intervals are variable depending on the type of road that the location is predicted to be on at the current time and/or based on the road type at past times and/or predicted future times. For example, if the current location is believed to be on a highway, the time interval can be lengthened compared to when the current location is believed to be on a residential street. In some embodiments, the reporting time intervals vary based on vehicle motion (e.g., stopped or idle vs. moving). For example, in some embodiments reporting time intervals can be decreased for stopped or idle vehicles and reporting time intervals can be increased when the vehicle is in motion.

At block 245, the constructed vehicle routes are output for display on the map portion 116 of the vehicle management user interface 114. The constructed vehicle routes can represent the most probable or most likely route traveled by the selected vehicles. In some embodiments, an additional benefit can be provided by generating alerts (e.g., speeding alerts) to a user (e.g., a manager) based on the constructed routes, the telematics data (e.g., vehicle speed information), and/or mapping information (e.g., speed limit data for the roads along the constructed route).

With reference to FIG. 4, one possible vehicle management user interface 400 is represented that can be generated in response to adding a cluster of vehicles identified on a map display portion 116 of the vehicle management user interface 400. The vehicle management user interface 400 includes a map display portion 405 and a history timeline display portion 410.

The map display portion 405 can display a plurality of routes 468 representing fitted history routes constructed by the fleet management module 112 (e.g., the routing module 130) for a plurality of vehicles selected by a user for visualization. The fitted history routes 468 can be constructed based on interpolations between reported locations over a time period interval. Routes corresponding to different vehicles can be displayed in a variety of colors to differentiate between vehicles and/or routes (as shown in FIG. 4). However, in other embodiments, other methods of differentiation can be used (e.g., line patterns, symbols, text). In some embodiments, stops can be shown on the routes with graphical and/or textual elements (e.g., icons).

In some embodiments, the display of the fitted history routes 468 can include an indicator of confidence in the calculated route or in segments, links, or legs of the calculated route. For example, portions of the route can be displayed in various colors depending on confidence level (e.g., green for high confidence, yellow for intermediate confidence, and red for low confidence). As another example, icons or symbols can be displayed for portions of the route to indicate confidence levels (for example, "??" can be used for route segments that are below a certain threshold). As yet another example, text can be displayed for portions of the route to indicate confidence levels. The confidence levels can be based at least in part on the scores and/or probabilities determined in the road identification processes and route calculation processes described herein; however, the confidence levels can be based on other factors as well.

In certain embodiments, the confidence for a particular route segment can be determined by multiplying the probabilities of the candidate roads selected during a road identification process (e.g., the road identification process 800 described with reference to FIG. 8) for the beginning and end of the route segment. For example, if the candidate roads selected at the beginning and end of the route segment each had a probability of 95%, then the overall confidence for the route segment would be 90.25%.

In certain embodiments, the confidence determination can be adjusted based upon a comparison of the travel time of the route segment with the time delta between the reported locations or positions. If travel time is greater than the actual reported time, then the confidence level can be reduced. The confidence determination can also depend on whether the determined locations of a route segment are the right distance apart based on the speed. As one example, if two adjacent reporting locations are determined to be located on a 25 mph road and the reporting locations are five miles apart over a two-minute interval, the confidence in that route segment or link can be rather low (even though it was determined to be the most likely route).

The confidence level may also be determined by repeating the route calculation process (e.g., the route calculation processes described herein) one or more times while applying penalties to the roads selected during the previous runs of the route calculation process (for example, increasing the cost of the roads when traversing the heap as described with reference to FIG. 10). The penalties can be increased for each successive run of the route calculation process (e.g., the speeds can be decreased more and more). If the same route is calculated despite the increasing penalties being applied, then the confidence level will be increased. If different roads are identified for parts of the route, then the confidence level will be decreased. As one specific example, if penalties are applied by reducing speeds by 50% and the same route is calculated, then the confidence level could be indicated as 95%. As another specific example, if a penalty is applied by reducing speeds by 5% and different roads are calculated, then the confidence level could be indicated as 50%. The confidence level may vary along the route, for example according to how many times each link or leg of the route appeared in the alternative routes that were generated by adjusting penalties as described above. Also, if different routes are calculated by this process then each could be displayed on the map with its respective confidence indicated as calculated by the methods described herein.

The history timeline display portion 410 displays vehicle status information over a period of time. The time period over which vehicle status data is obtained can be a day, a week, an hour, or the like. The time period can be the current 24-hour period, for instance. History timelines can also be generated for past days or other past time periods. Features of the history timeline display portion 410 that can be implemented in the vehicle management user interface 400 are described in more detail in U.S. patent application Ser. No. 13/251,129, filed on Sep. 30, 2011 and entitled "HISTORY TIMELINE DISPLAY FOR VEHICLE FLEET MANAGEMENT," the disclosure of which is hereby incorporated by reference in its entirety.

It should be noted that the fleet management module 112 can use any of a variety of technologies to generate the vehicle management user interface 400 or any of the other user interfaces described herein. For instance, the user interfaces described herein can be implemented using HTML, JavaScript, CSS, JSON, and/or XML programming. Such programming may be AJAX compliant. In some embodiments, the fleet management module 112 generates dynamic HTML, XHTML, or XML pages that include the content shown in any of the user interfaces depicted herein. This dynamic functionality can allow timelines 460 to be added and removed, colored, zoomed, or otherwise adjusted. The fleet management module 112 can generate this content in response to a request from a management device 135 described above. Other examples of technology that can be used to dynamically generate and/or manipulate the history displays or other user interfaces described herein include Adobe Flash, Java, Java Applets, Silverlight, Synchronized Multimedia Integration Language (SMIL), ASP.NET, iframes, jQuery, PHP, J2EE, combinations of the same, and the like. Further, vehicle status data, telemetry data, and history timeline data can be stored in any data repository having physical computer storage, such as a database, file system, other data store, or a combination of the same.

Figure 4A:
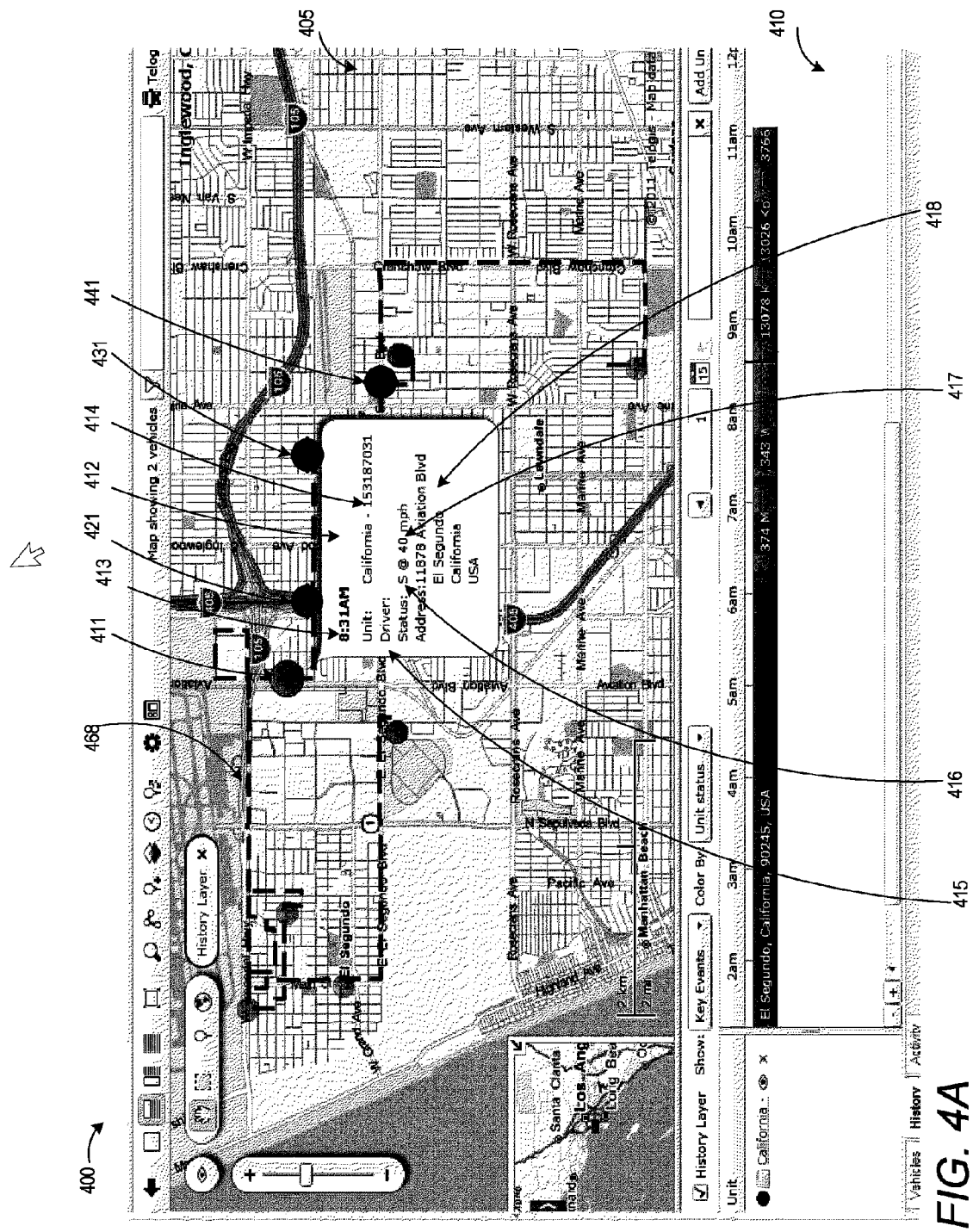

FIG. 4A illustrates the vehicle management user interface 400 with all of the vehicles and corresponding routes 468 removed from the history display portion 410 and the map portion 405 except for one. As shown, the map portion 405 displays a constructed fitted route 468 for a single vehicle. The user interface 400 can enable the map portion 405 to zoom in or out based on the routes being displayed. As shown in FIG. 4A, the map portion 405 has been zoomed in on the single route 468 being displayed. In certain embodiments, the route 468 can be displayed as a dashed line or ant trail. In other embodiments (for example, as shown in FIG. 5), the route 468 is displayed as a solid line. Other line patterns or features can also be used. In certain embodiments, the displayed route 468 can indicate direction of travel by incorporating an animation feature or effect such that the route 468 appears to move along a direction of travel, thereby providing a user with a visual representation of the direction of travel.

FIG. 4A further illustrates four reported locations received two minutes apart for the particular vehicle that traveled on the route 468 shown. As shown in connection with point 411, a pop-up box 412 can be displayed that includes vehicle status details for display to a user (including time stamp information 413, vehicle identification information 414, driver identification information 415, direction of travel information 416, speed information 417, corresponding address information 418) in addition to the location identification on the map.

Point 411 corresponds to a reported location received at 8:31 AM wherein the vehicle was heading south at 40 mph and the corresponding address of 11878 Aviation Blvd in El Segundo, Calif. Point 421 corresponds to a reported location received at 8:33 AM (two minutes later). At point 421, the vehicle was heading east at 37 mph and the corresponding address was 5063 W. $128^{th}$ St in Hawthorne, Calif. Point 431 corresponds to a reported location received two minutes later at 8:35 AM. The vehicle was heading east at 40 mph and the corresponding address was 4276 W. $120^{th}$ St in Hawthorne, Calif. Point 441 corresponds to a reported location received at 8:37 AM, wherein the vehicle was heading north at 0 mph and the corresponding address was 12753 Prairie Ave in Hawthorne, Calif.

Figure 5:
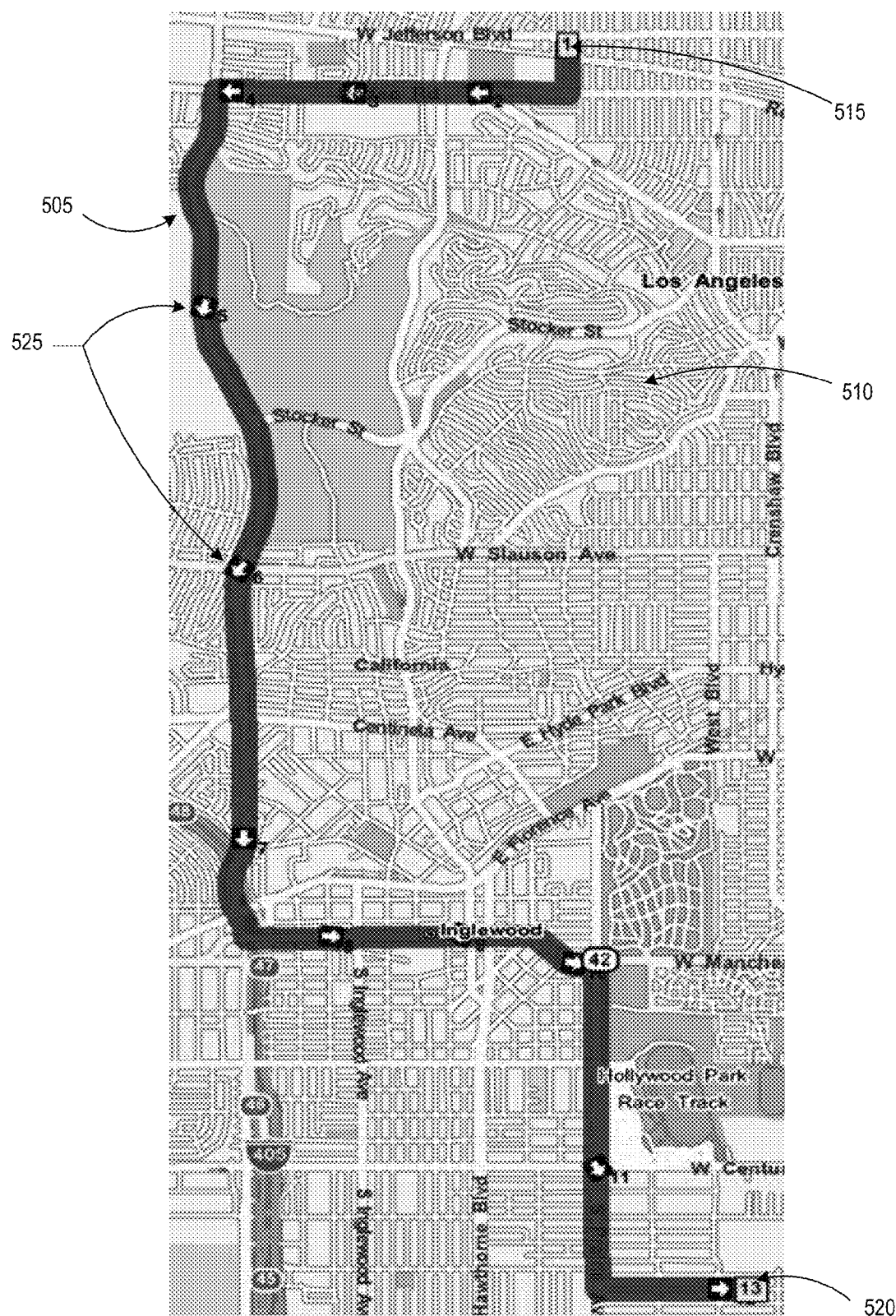

Turning to FIG. 5, an embodiment of a zoomed-in section of a map portion of a user interface with a displayed route 505 overlaid on an underlying road map 510 is illustrated. As shown, the displayed route 505 advantageously tracks actual road segments of the road map 510 rather than simply connecting points with straight lines without any correlation to the road map 510, thereby providing to the user a more accurate representation of the actual route traveled by the vehicle.

The displayed route 505 includes a starting point 515 and an ending point 520. The starting point 515 and the ending point 520 can correspond to known route stops. The displayed route 505 also includes multiple intermediate points 525 corresponding to calculated vehicle locations at different times along the route between the starting point 515 and the ending point 520. The intermediate points 525 include a heading indicator (represented as an arrow). The intermediate points 525 can be calculated by comparing characteristics of the telematics data obtained from the vehicle with road information obtained from mapping data, as described in more detail below. The displayed route 505 can be determined using the route construction or route calculation processes described herein.

In certain embodiments, a user can manually alter the locations or heading indications of the starting point 515, the ending point 520, and/or the intermediate points 525. If the locations or heading indications are altered, a new route can be calculated and re-displayed based on the alterations by repeating a route calculation and display process.

IV. Vehicle Route Calculation Processes

Figure 6:
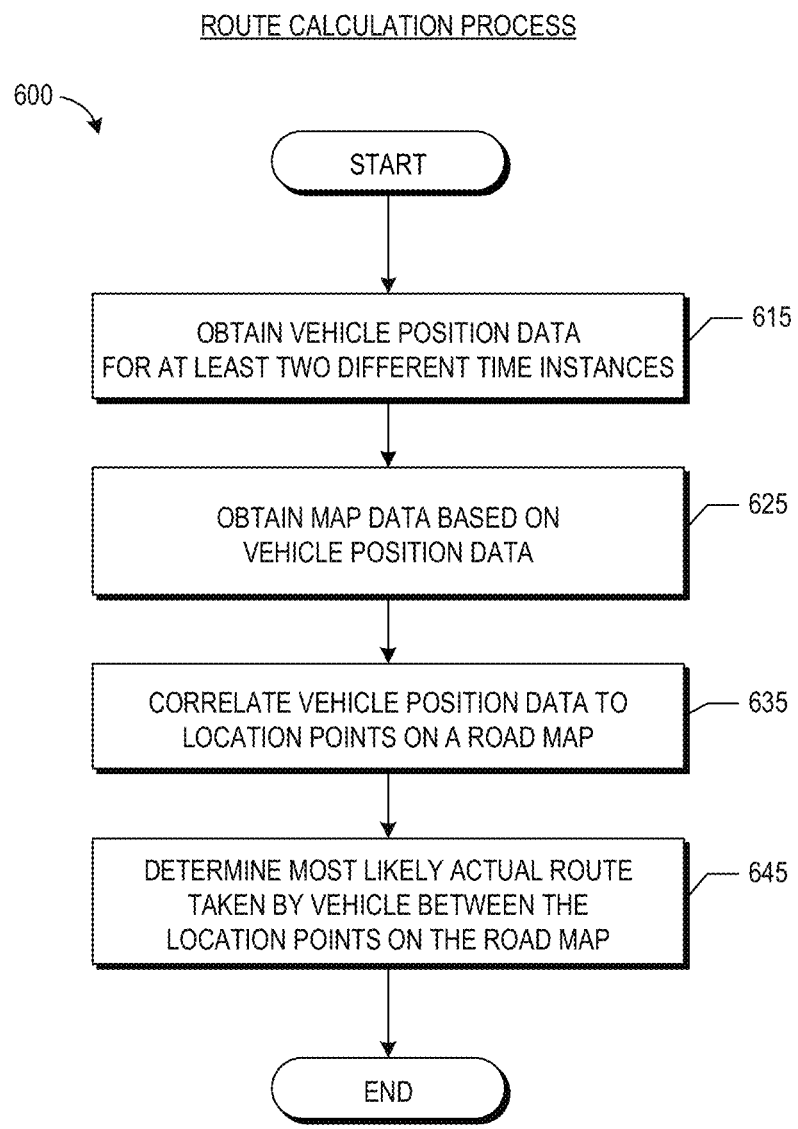
FIG. 6 illustrates an embodiment of a route calculation process that can be implemented by the vehicle management system of FIG. 1.

FIG. 6 illustrates an embodiment of a route fitting, or route calculation, process 600 that determines a most likely or most probable route taken by a vehicle between at least two reported locations received at two different times. The route calculation process 600 advantageously fits, infers, or interpolates a route between two "known" locations on a map that correspond to reported locations received from an in-vehicle device (e.g., a GPS unit) of a vehicle at particular time instances. Typical systems simply connect the known points using straight lines corresponding to the shortest distance between the points without regard to the road network information. The route calculation process 600 can compare or correlate the characteristics of vehicle status information (such as position, time, speed, heading) with the road network information to provide a more accurate calculation of the actual route taken and can facilitate display of the calculated route on a virtual road map.

The route calculation process 600 can be implemented by the fleet management module 112. In some embodiments, the route calculation process 600 is implemented by the routing module 130 of the vehicle management system 110. At block 615, vehicle position data is obtained for at least two different times along a vehicle route. The vehicle position data can be obtained from the telematics data periodically or intermittently received by the telematics module 120 from an in-vehicle device, for example. The vehicle position data can include latitude and longitude or other geographical position coordinates and a time stamp or indication of duration from the previous reported position.

At block 625, mapping data (e.g., road network data) can be obtained based, at least in part, on the vehicle position data. The mapping data can be obtained from the mapping module 115, for example. At block 635, the vehicle position data is correlated to physical location points on a road map (e.g., a road network including highways, arterial roads, residential roads, dirt roads, other classes of roads; a railway network; a flight path network, and/or the like).

At block 645, the route calculation process 600 determines the most likely or most probable actual route traveled by the vehicle between the location points on the map corresponding to the reported vehicle positions received from the vehicle. The most likely actual route can advantageously be fitted to the mapping data (e.g., road network) to improve display of the route on a virtual map for management personnel. In some embodiments, the determination of the most likely route can be based on the position or location data, and the time data corresponding to the position or location data, either alone or in combination with the mapping data. In other embodiments, the determination of the most likely route can optionally include analysis of other vehicle status data (such as vehicle speed data, vehicle direction of travel data) or other data (such as driver profile data and/or historical route data).

Figure 7:
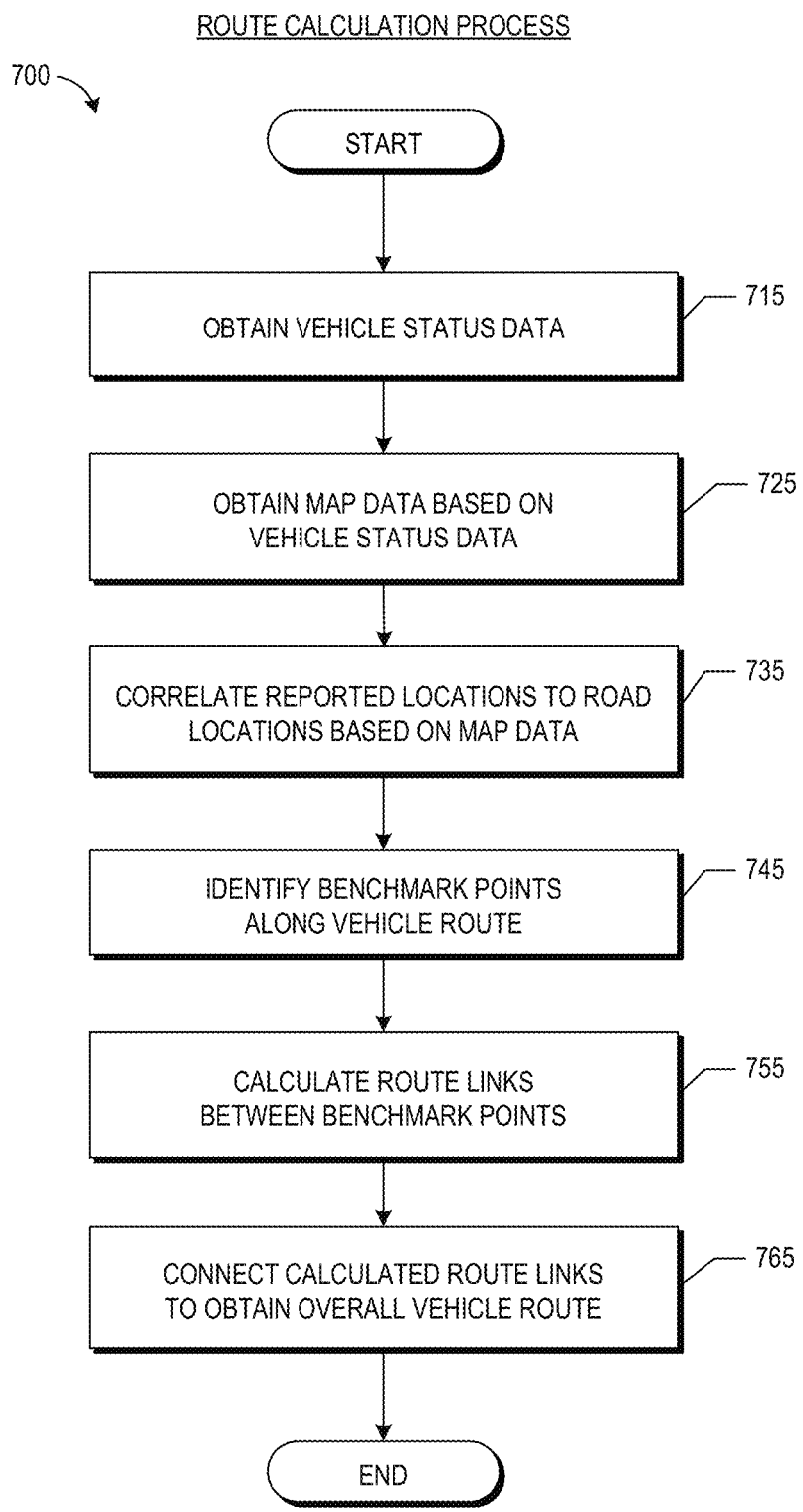
FIG. 7 illustrates another embodiment of a route calculation process that can be implemented by the vehicle management system of FIG. 1.

FIG. 7 illustrates another embodiment of a vehicle route calculation process 700. The vehicle route calculation process 700 advantageously involves an additional benefit that can be achieved by providing the additional optional feature of identification of benchmark (e.g., more likely, more probable, high confidence, or "critical") points along the vehicle route to speed up processing times and reduce memory use requirements. However, in some embodiments of the vehicle route calculation processes described herein, identification of more probable or more likely location points is optional. Because the identification of these benchmark, high confidence, or "critical" points is optional, the term "critical" as used herein should not be interpreted as meaning that the points are absolutely necessary for the vehicle route interpolation processes to be implemented.

At block 715, vehicle status data is obtained from a vehicle history report. The vehicle status data can be obtained from a data store device, for example. In some embodiments, the vehicle status data can be obtained from the telematics data received by (and possibly stored in or accessible by) the telematics module 120. As described above, the telematics data can include vehicle position data and corresponding time data and/or other vehicle status data (e.g., speed data, heading data, engine sensor data) obtained from reporting devices (e.g., GPS units) of fleet vehicles at periodic or intermittent time intervals.

At block 725, mapping data is obtained based at least in part on the vehicle status data, as described above in connection with block 625 of FIG. 6. At block 735, reported vehicle locations are correlated to road locations based on the mapping data, similarly as described above in connection with block 635 of FIG. 6.

The more likely or more probable (e.g., benchmark, high confidence, or "critical") points are identified along a vehicle route at block 745. The benchmark points can correspond to points for which the vehicle interpolation process 700 has high confidence in the accuracy of the location (e.g., based on probability assessments). The first and last reported points comprise benchmark points by default. An example process for identifying benchmark points will be described in more detail in connection with FIG. 13.

Route links are calculated between identified benchmark (e.g., high confidence) points at block 755 using routing calculation algorithms (e.g., Dijkstra's algorithm) implemented using data structures such as heaps, trees, or queues. There may be one, two, or more non-benchmark, or non-"critical" points between each pair of adjacent benchmark, or "critical", points along a route. Block 755 includes calculation of the likely route legs between each set of adjacent points and selection of the connected legs that will form a route link between each pair of benchmark points. An example process for calculating route links will be described in more detail in connection with FIGS. 9 and 10. In certain embodiments, a route link may be referred to as a "super-leg" because it includes one or more route legs joined together.

At block 765, the calculated route links are connected or stitched together to obtain the overall estimate of the actual route traveled by the vehicle. The connection of the route links can include first connecting or stitching the route links between adjacent pairs of points between each pair of high confidence points in sequence and then connecting or stitching the route segments between each pair of adjacent high confidence points together.

1. Road Candidate Identification Processes

Figure 8:
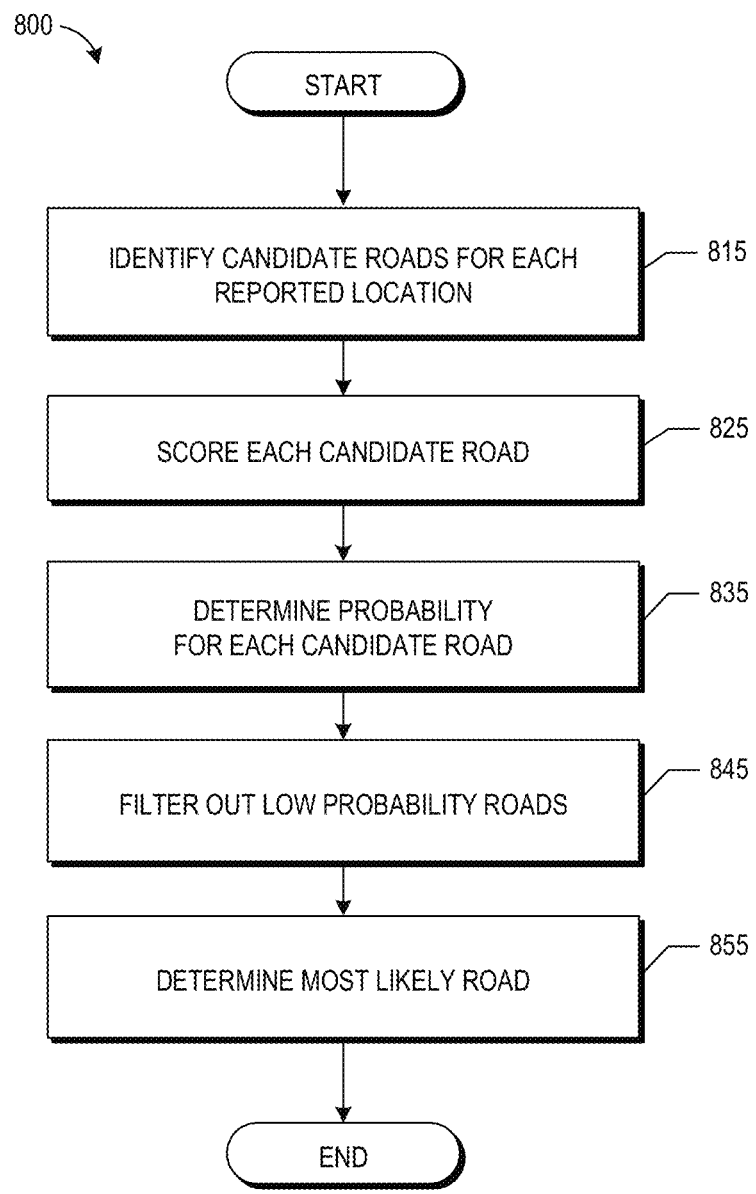
FIG. 8 illustrates an embodiment of a road identification process that can be implemented by the vehicle management system of FIG. 1.

Turning to FIG. 8, a road candidate identification process 800 is illustrated. In some embodiments, the road candidate identification process 800 is an optional subroutine corresponding to block 635 of FIG. 6 or to block 735 of FIG. 7. The road candidate identification process 800 can be implemented by the vehicle management system 110 of FIG. 1.

Starting at block 815, candidate roads are identified for each reported location identified from the vehicle status data from the vehicle history report. As described above, the reported locations can correspond to locations at different times (periodic or intermittent) along the traveled route. In some embodiments, identifying candidate roads includes finding the nearest n candidate roads, or streets, to each reported location based on proximity. For example, the five nearest roads, or streets, can be identified. In some embodiments, the number n can vary depending on various factors. For example, the number n can be higher if it is predicted that the reported location corresponds to a residential area with lots of roads and the number n can be lower if it is predicted that the reported location corresponds to an interstate highway or rural area.

In some embodiments, candidate roads are selected from the roads or streets contained within a defined region surrounding the reported location in order to be considered for routing.

Figure 11A:
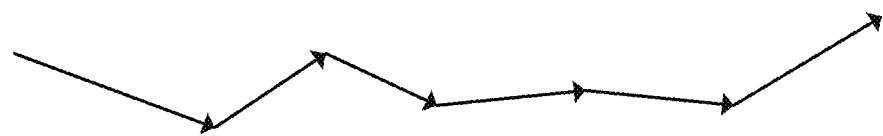
FIGS. 11A-11C illustrate an example of an implementation for limiting the scope of possible candidate roads during the road identification process of FIG. 8.
Figure 11B:
Figure 11C:
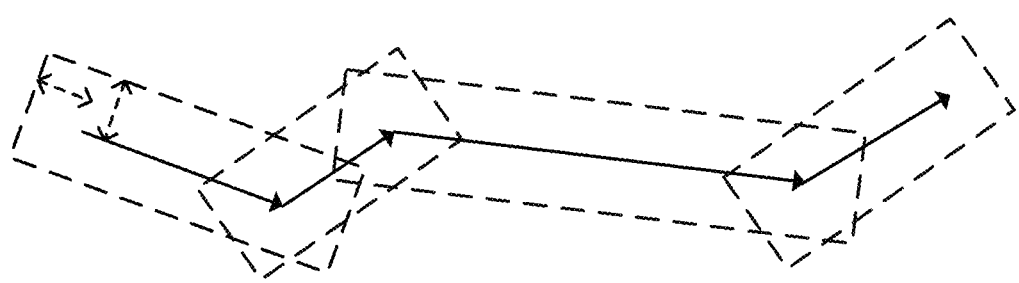

Turning to FIGS. 11A-11C, three line diagrams are depicted showing reported locations received from a vehicle at different times along its route. FIG. 11A illustrates a line drawn directly between successive reported locations. FIG. 11B illustrates a simplified line using the Douglas-Peucker algorithm with an epsilon value set to the distance a vehicle would have traveled if travelling at 40 mph during the interval between reports (e.g., two minutes). Other simplification algorithms can be used without departing from the spirit and/or scope of the disclosure. FIG. 11C illustrates boxed regions or strips between each consecutive point in the simplified line. The edges of the boxed regions or strips are a distance of A+B/2 from the line, where A is the maximum distance of the stops from the simplified line, and B is the distance a vehicle would have traveled if travelling at an estimated maximum sustainable speed for the vehicle (e.g., 80 mph for a car or 60 mph for a large speed-limited delivery truck) during the interval between reports (e.g., two minutes), the idea being that in a worst-case scenario (in certain embodiments), the vehicle would have driven off at the estimated maximum sustainable speed and then turned straight around in order to get to the next reported location just in time. By defining the distance B based on an estimated maximum sustainable speed, the performance of the algorithm(s) (e.g., Dijkstra's algorithm) can be improved because fewer roads are evaluated.

As another example, in some embodiments, the candidate roads are the nearest n roads within a certain fraction of a degree of the reported location (e.g., less than 100 meters). In some embodiments, the identification of candidate roads involves reverse geocoding. It may be possible that due to the regional limitations, there may not be n candidate roads. For example, there could be zero or only one candidate road for a reported location.

Referring back to FIG. 8, at block 825 each candidate road is scored. The scoring of the candidate roads can include a variety of inputs or factors, which can be determined from vehicle status information (e.g., location, speed, direction), mapping information (e.g., road class, posted speed limits, road alignment), and/or comparisons with previous and/or next reported locations. The various inputs or factors can be weighted differently. The inputs or factors can include proximity of the road or street to the reported location, the current speed of the vehicle compared to the posted speed limit for the road, the current vehicle heading compared to the alignment of the road, the class of the candidate road (e.g., highway, arterial, surface (e.g., residential)) compared to the class of the best candidate road of the previous and/or next reported location, whether the candidate road would be the same road as the previous and/or next best candidate road, and/or the like. The classifications of roads can vary from country to country or from region to region.

As one example, if a previous location was on a highway and the next location is on a highway, the candidate roads corresponding to surface roads or classes of roads other than highways may be penalized or have their scores reduced. In some embodiments, if the reported location is a long way from any roads, residential surface streets are selected (or at least penalized less) over highways because it is unlikely that the vehicle could legally turn straight onto a highway from an off-road location.

Figure 12:
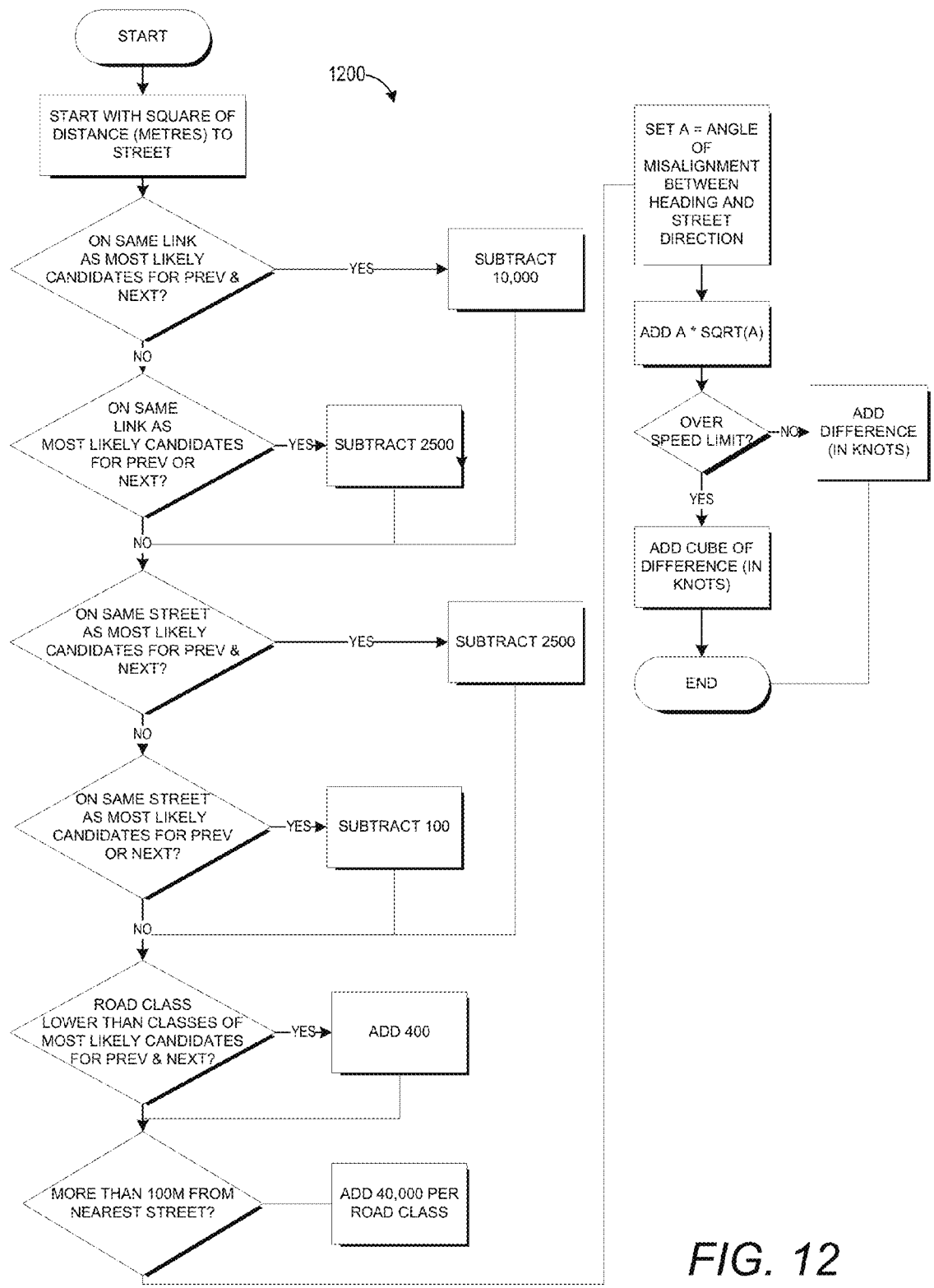
FIG. 12 illustrates an example optional flow chart of a score generation process for candidate links or roads.

With reference to FIG. 12, an example of an optional road candidate scoring flowchart 1200 is illustrated. As shown, bonuses and penalties of different amounts or weights can be assigned to the various inputs or factors of the score. The scoring of the candidate scoring flowchart 1200 starts with the squared distance to the candidate road in meters. A bonus amount can be assigned for staying on the same road as the previous and/or next road. Temporary movements from a high road class to a low road class can be penalized. In addition, roads that are not well aligned with the reported location heading can be penalized. Penalties can be assessed based on speed limit information compared with reported speed.

In some embodiments, the scoring of the candidate roads is iterated several times because the road candidate identification process 800 cannot deal with each of the reported locations independently. Viewed in another way, the identification of the best candidates for each reporting location depends on the determinations of the best candidates for the adjacent reporting locations. Accordingly, in some embodiments, the scoring of the candidate roads involves starting at a first reported location, assigning a score to each of the candidate roads at the first reported location, and then repeating the scoring process for each successive reported location to the final reported location and then repeating the scoring process for each successive reported location back to the first reported location. This forward and backward process can be iterated or repeated multiple times until the road candidate identification process 800 determines that each reported location has been processed enough times to have a certain confidence in the assigned scores. In some embodiments, the scoring process goes forward and back two times such that each reported location goes through the scoring process four times, with the scores being updated for the candidate roads every time through. The particular scoring numbers and scoring schemes used are optional examples and can be changed in various embodiments as desired and/or required.

Referring back to FIG. 8, at block 835, a probability is determined for each candidate road by comparing the scores of the candidate roads to each other. If there is only one identified candidate road then the probability is 100%. Otherwise, for each candidate, the probability is calculated relative to the score of the worst candidate. The relative probability is given by worst score divided by current score. The relative probabilities are then converted into proper probabilities by scaling them so that their sum is 100%. In some embodiments, it is possible that a very good candidate's score is less than or equal to zero. If this is the case, then the scoring scale can be shifted so that the best score is one, thereby preventing any negative or zero probabilities. At block 845, the lowest probability candidate roads are filtered out. For example, candidate roads with probabilities less than 10% can be discarded. At block 855, a most likely candidate road can be determined based on the probability values. This most likely candidate determination can be used to assess penalties to the candidates that are not the most likely during the route calculation process. The techniques and methods described herein to determine probabilities are optional examples and can be changed in various embodiments as desired and/or required.

2. Route Calculation Processes

Figure 9:
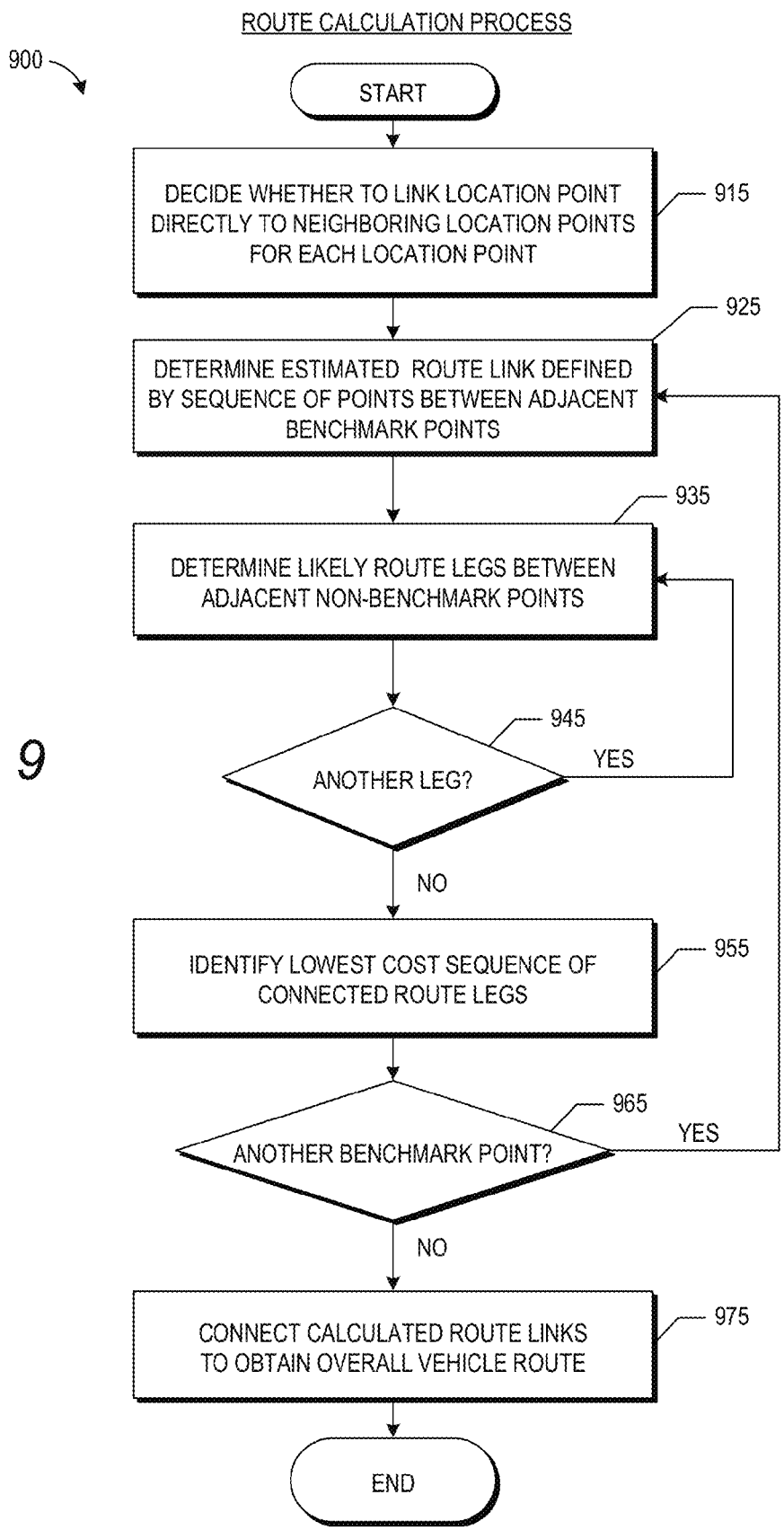
FIG. 9 illustrates an embodiment of an overall route calculation process.

With reference to FIG. 9, a route calculation process 900 is illustrated for constructing estimated (e.g., most likely) actual routes based on a plurality of reported locations from a vehicle at different times along a route. In some embodiments, the route calculation process 900 advantageously "fits" the route between best candidate map locations corresponding to the reported vehicle position locations. The route calculation process 900 can be an optional subroutine of block 755 of FIG. 7. In some embodiments, the route calculation process 900 is implemented by the vehicle management system 110 and in particular, can be implemented by the fleet management module 112 and/or the routing module 130.

Starting at block 915, each reported location point is analyzed to determine whether the reported location point should be directly linked to its neighboring location points. A reported location point can be directly linked to its neighbors if the nearest candidate street is greater than a certain predetermined distance d away. In some embodiments, a reported location point is directly linked to its neighbors if the location point is closer to the next location point than it is to the nearest road or street. If it is determined that the current location point should be directly linked to its neighboring location points, the location points are linked directly without determining the most likely route path between the neighboring points. Once all the direct links between neighboring location points are formed, the route calculation process 900 proceeds to block 925.

At block 925, the route calculation process 900 determines the estimated (e.g. most likely, lowest cost) route link defined by the sequence of route legs connecting the vehicle location points between each pair of adjacent benchmark points (e.g., high confidence or "critical" points), starting with the first two benchmark points. The process of determining the estimated (e.g., most likely) route link defined by the sequence of vehicle location points between each pair of adjacent benchmark points begins with a determination of the likely route legs between the first benchmark point and the first non-benchmark point in the route link (for example, based on the candidate roads identified by road candidate identification process 800). The first benchmark point is the first map location point corresponding to the first reported location point. A process for determining route links between adjacent location points is described in connection with FIG. 10.

After the likely route legs between the first benchmark point and the first non-benchmark point are determined, the route calculation process 900 determines whether another route leg exists in the route link between the two benchmark points at decision block 945. If another leg exists, then the likely route legs are determined for the leg between the first non-benchmark point and the second non-benchmark point of the route link. Block 935 is repeated until the likely route legs are determined for the leg between the last non-benchmark point of the route link and the second benchmark point of the route link. In certain embodiments, costs for each route leg are determined during the determination of the likely route legs for each adjacent pair of location points. If no other legs exist in the sequence, then the lowest cost sequence of connected route legs from the previous benchmark point to the current benchmark point is identified or selected at block 955, which can represent the most likely (e.g., lowest cost) route link between adjacent benchmark points.

In certain embodiments, the most likely route link does not include the lowest cost route leg between each pair of adjacent points because the overall cost of the route link that they are a part of has a higher cost than another route link or the lowest cost route leg does not form a part of a connected sequence of route legs to form a route link; instead, the most likely route link can include the sequence of route legs with the lowest overall cost between two benchmark points. The route legs selected to be components of the most likely route link are part of a continuous chain of route legs between the benchmark points. Even if a route leg has a low cost, if the route leg is not connected to any other location points or if the route leg would lead to a location from which it would be very "expensive" to get to the next set of candidate roads, then it may not be selected.

Figure 9A:
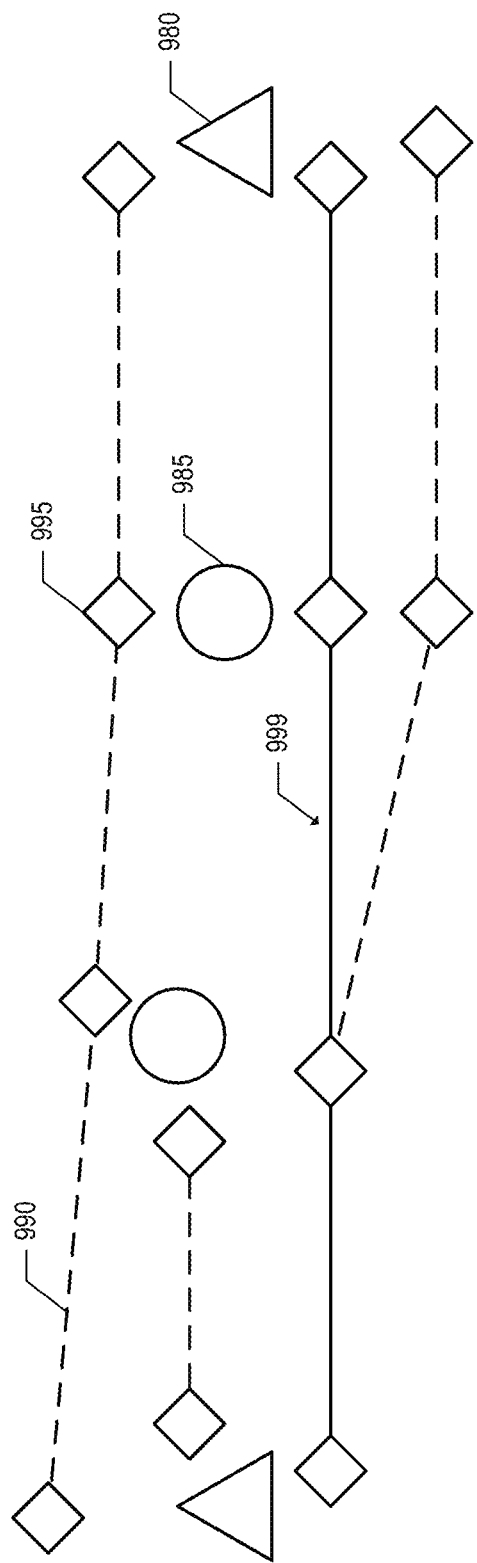
FIG. 9A illustrates a schematic diagram of a most likely route link determined between two adjacent benchmark vehicle location points by the route calculation process of FIG. 9.

With reference to FIG. 9A, a schematic diagram of two adjacent benchmark points 980 (represented as triangles) with two intermediate non-benchmark points 985 (represented as circles) is provided to illustrate the operation of the route calculation process 900 at blocks 935, 945 and 955, in accordance with certain embodiments. FIG. 9A illustrates the likely route legs 990 between each adjacent pair of location points determined at block 935. The likely route legs 990 can connect candidate roads 995 identified during the road candidate identification process 800, for example. As discussed above, in certain embodiments, each likely route leg 990 can have an associated cost. FIG. 9A illustrates the route link 999 (comprising a connected sequence of likely route legs 990) having the lowest overall cost with a solid line pattern and the likely route legs not selected with a dashed line pattern. The route link 999 can be identified for example, at block 955 of the route calculation process 900.

Referring back to FIG. 9, at decision block 965, the route calculation process 900 determines whether another benchmark point (e.g., high confidence or "critical" point) exists. If all of the benchmark points have been traversed, the most likely (e.g., lowest cost) route links between adjacent benchmark points are connected or stitched together at block 975. If there is another benchmark point, the route calculation process 900 returns to block 925.

Figure 10:
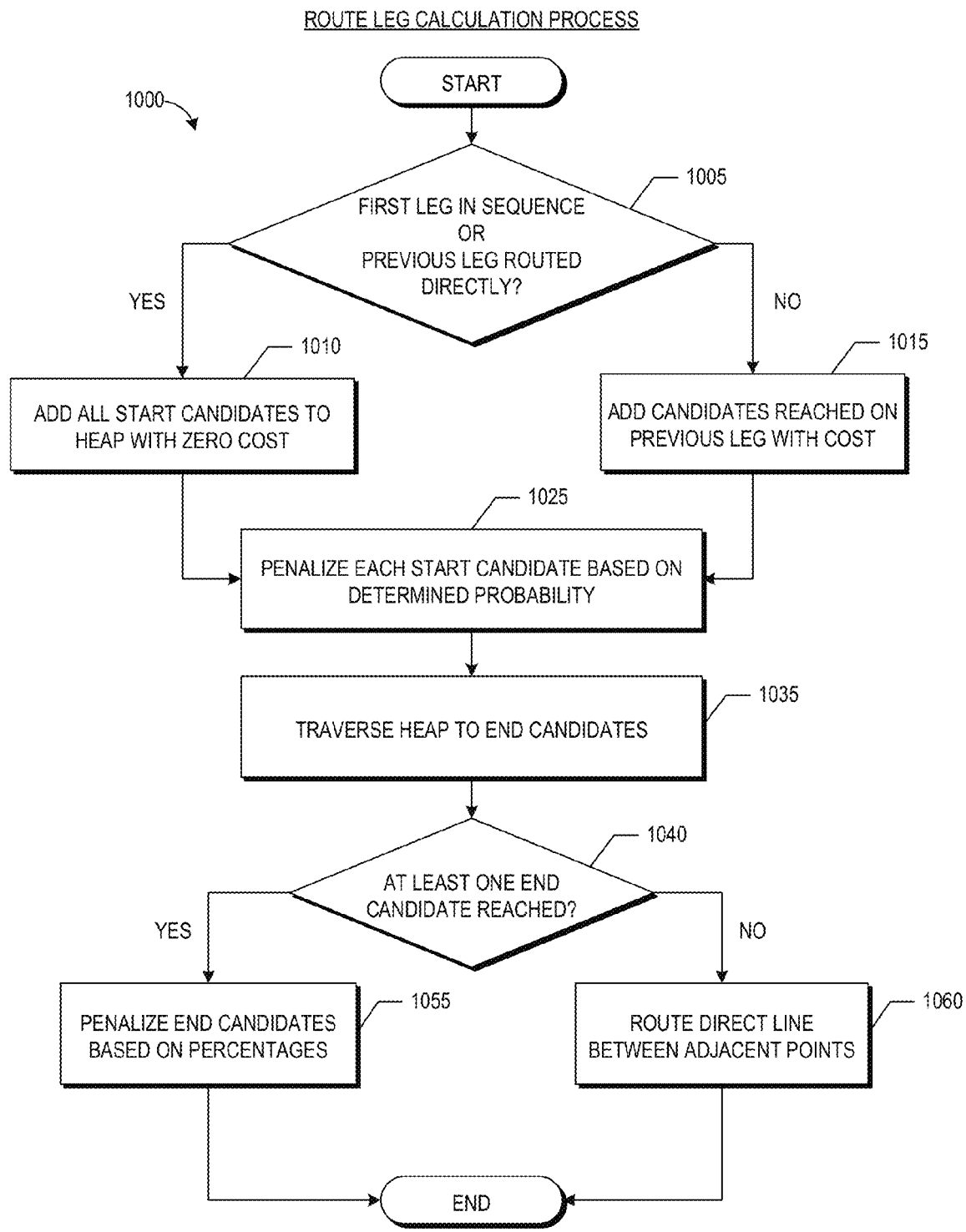
FIG. 10 illustrates an embodiment of a route leg calculation process.

Turning to FIG. 10, an embodiment of a route leg calculation process 1000 is illustrated. The route leg calculation process 1000 can comprise an optional subroutine performed at block 755 of FIG. 7 and/or block 925 of FIG. 9. The route leg calculation process 1000 calculates the likely paths traveled by the vehicle between adjacent reported location points (e.g., based on identified or calculated costs).

The process 1000 starts at decision block 1005, wherein the process 1000 determines whether the reported location point is the first reported location point in the sequence of reported location points between adjacent benchmark (e.g., high confidence or "critical" points) or if the previous route leg was routed directly. If either is true, then the route leg calculation process 1000 adds all start candidates to a heap with zero cost (block 1010). If neither is true, then the route leg calculation process 1000 adds the candidates reached for the previous leg with the cost accrued up to that point (block 1015), thereby advantageously storing the total cost up to that point. In certain embodiments, the process step at block 1015 makes it easier to select the most likely route link (for example, at block 955 of route calculation process 900) later in the process (e.g. once all the legs between the two adjacent benchmark points have been calculated), because the endpoint of the most likely route link is the same endpoint that has the lowest cost at the second benchmark point. Performance of the process step at block 1015 can ensure that only connected sequences of route legs (which can be referred to as route links or super-legs) reach the second benchmark point and that the final costs of the candidate route links are the cumulative sum of the costs of the individual route legs that form each candidate route link. The costs can be determined based on one or more cost factors (such as shortest distance, fastest time, least energy, and/or the like) as described in more detail in U.S. application Ser. No. 12/954,547 filed on Nov. 24, 2010 and entitled "VEHICLE ROUTE SELECTION BASED ON ENERGY USAGE", the disclosure of which is hereby incorporated herein by reference.

At block 1025, each start candidate is penalized (e.g., cost is increased) based on determined probability, with lower probability candidates being penalized more than the higher probability candidates. The heap is then traversed until the end candidates are all reached or until the route time is X times (e.g., 4 times) the time interval between reports at block 1035. The heap can be traversed using Dijkstra's algorithm or any other suitable routing algorithm. As the heap is traversed, the time it would have taken to travel the route portions (e.g., legs, links) is calculated and kept track of. If the total accrued time from the starting point to the current point in the heap gets above a predefined time (e.g., a multiple of the reporting time interval), the traversal of that route leg is discontinued. This can advantageously reduce processing times and prevents wasted time on unlikely route legs (especially for rogue or obviously erroneous reported locations that can correspond to locations that are not even remotely close).

The route leg calculation process 1000 then proceeds to decision block 1040, wherein a determination is made as to whether at least one end candidate was reached. If so, then the end candidates are penalized based on probability percentages at block 1055 and the heap or other data structure is disposed of, or cleared, so that the next leg starts with a clean data structure. If at least one end candidate is not reached, a direct line is routed between the adjacent points at block 1060 and the heap or other data structure is disposed of, or cleared, so that the next leg starts with a clean data structure.

In accordance with certain embodiments, the route leg calculation process 1000 is repeated for each route leg between each pair of adjacent location points. For example, with reference to FIG. 9A, which has three pairs of adjacent location points, the route leg calculation process 1000 is performed three times to determine the most likely route link 999.

Figure 13:
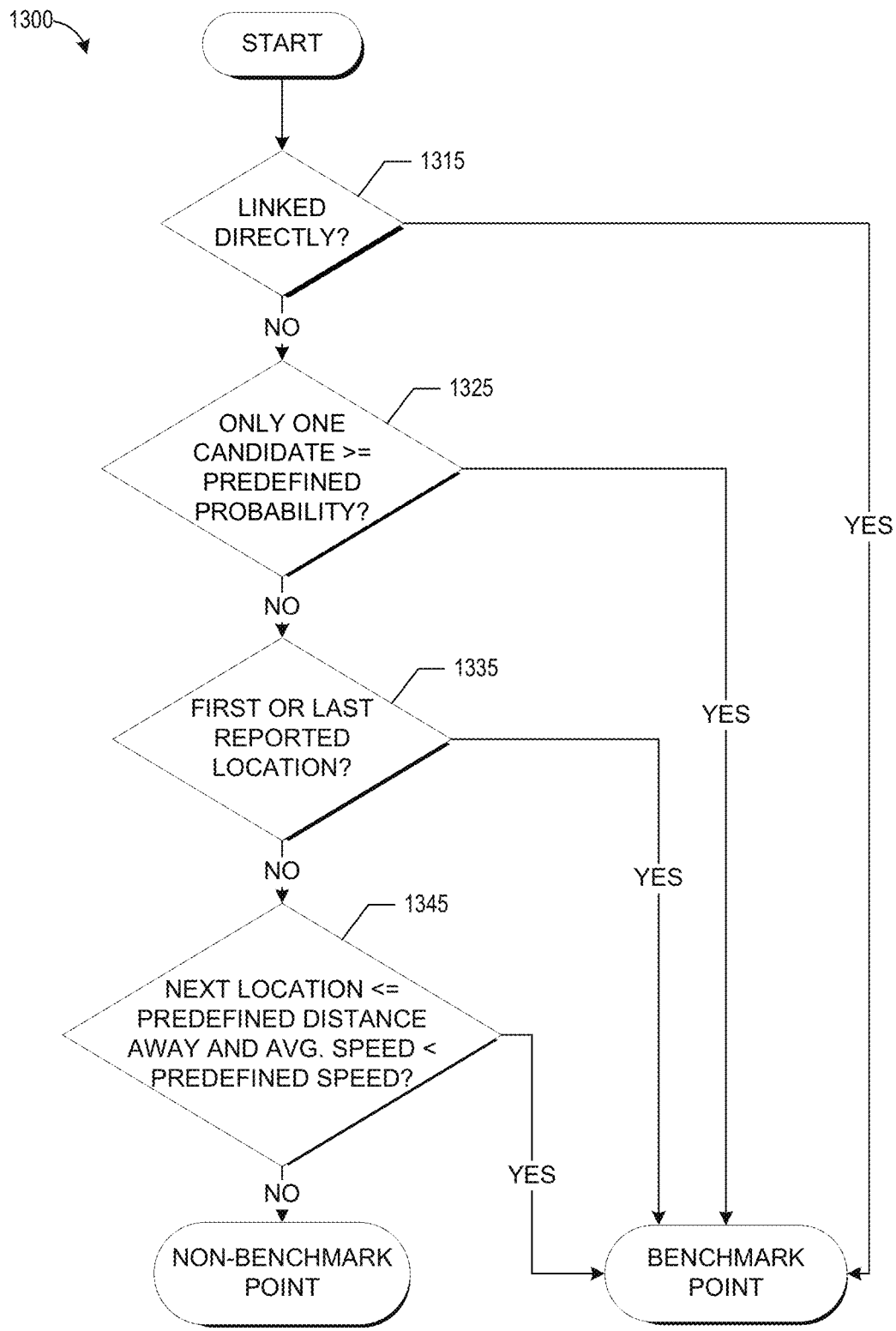
FIG. 13 illustrates an embodiment of a decision tree for identifying benchmark points along a vehicle route.

With reference to FIG. 13, an embodiment of an optional flowchart 1300 is illustrated for determining whether a reported location point is a benchmark point (e.g., high confidence point or "critical" point). The flowchart 1300 can be implemented by block 745 of the route interpolation process 700 of FIG. 7. At decision block 1315, it is determined whether the reported location point is linked directly to a neighboring point. If so, the reported location point is identified as a benchmark point. If not, then the flowchart 1300 proceeds to decision block 1325, wherein it is determined whether there exists only one candidate road that has greater than or equal to a predefined probability (e.g., ten percent, fifteen percent, twenty percent, twenty-five percent, thirty percent, etc.)

If only one candidate road exists, then the reported location point is identified as a benchmark point. If not, then the flowchart 1300 proceeds to decision block 1335, wherein it is determined whether the reported location point is the first or the last reported location point for the route. If the reported location point is the first or the last reported location point, then the reported location point is identified as a benchmark point.

If the reported location point is not the first or last reported location point, then the flowchart 1300 proceeds to decision block 1345, wherein it is determined whether the next reported location point is less than or equal to a predefined distance away (e.g., 500 meters) and the average speed of the vehicle is less than a predefined speed (e.g., one meter per second). If so, then the reported location point is a benchmark point. If not, then the reported location point is not a benchmark point. As discussed above, the identification of benchmark points, or "critical" points, is optional and not required; the route calculation processes can calculate the most likely route between the first reported location point and the last reported location point without any intermediate benchmark points.

V. Additional Embodiments

Figure 14:
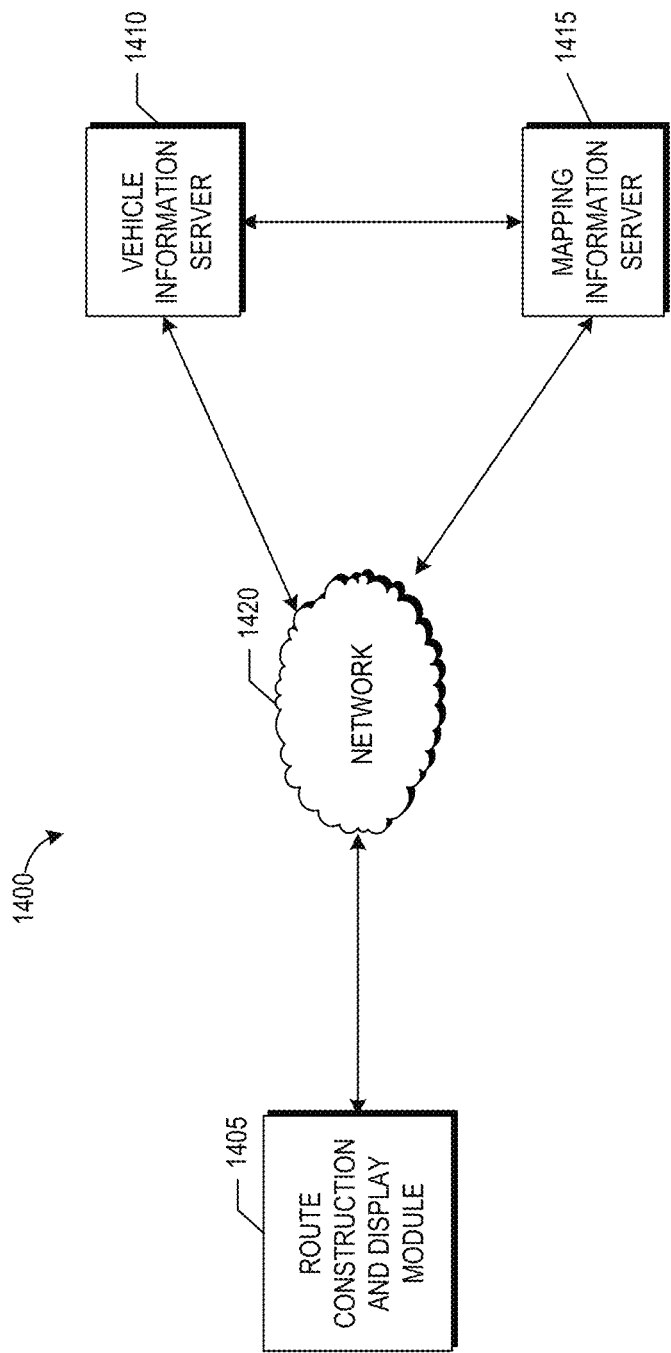
FIG. 14 illustrates an embodiment of a vehicle route calculation and display system.

With reference to FIG. 14, an embodiment of a system 1400 for implementing the route construction and display process 200 is illustrated. The system 1400 includes a route construction and display module 1405, a vehicle information server 1410, a mapping information server 1415, and a network 1420. The route construction and display module 1405 sends requests to the vehicle information server 1410 and to the mapping information server 1415 and receives data or information in response to the requests. The illustrated network 1420 may be a LAN, a WAN, the Internet, a shared computing network (e.g., cloud computing network), a wired network, a wireless network, combinations of the same, or the like. In certain embodiments, the network 1420 is the network 145 of FIG. 1. The vehicle information server 1410 and the mapping information server 1415 may be communicatively coupled via a separate network (not illustrated), such as a local network (e.g., a high speed LAN) to improve data transfer time. The vehicle information server 1410 and the mapping information server 1415 can comprise a single computing and/or storage device or a cluster of computing and/or devices.

The route construction and display module 1405 can be a component of, or can be implemented in conjunction with, the routing module 130 and/or the fleet management module 112 of the vehicle management system 110. In certain embodiments, the route construction and display module 1405 is configured to execute a Silverlight software application in conjunction with the vehicle management user interface 114. The vehicle information server 1410 can be a component of, or can be implemented in conjunction with, the telematics module 120. The mapping information server 1415 can be a component of, or can be implemented in conjunction with, the mapping module 115.

In certain embodiments, the route construction and display module 1405 requests historical vehicle status data for one or more fleet vehicles from the vehicle information server 1410 and calculated route data from the mapping server 1415 in response to a user request to display a calculated actual route for the one or more fleet vehicles. The route construction and display module 1405 can generate a globally unique identifier (GUID) to share with the vehicle information server 1410 and the mapping information server 1415 so that the mapping information server 1415 can fetch the historical vehicle status data directly from the vehicle information server 1410.

In response to the request for historical vehicle status data (which can include the GUID, identification of one or more vehicles, and identification of a timespan), the vehicle information server 1410 loads the historical vehicle status data, temporarily stores the historical vehicle status data in association with the GUID and sends the historical vehicle status data to the route construction and display module 1405. The route construction and display module 1405 can output a temporary display route on the map display portion 116 of the vehicle management user interface 114 based on the historical vehicle status data received from the vehicle information server 1410. The temporary display route simply uses straight lines between route stops.

In response to the request for calculated route data, the mapping information server 1415 requests the historical vehicle status data from the vehicle information server 1410 using a URL or other reference corresponding to the particular historical vehicle status data to be obtained that was received with the request. In response to the request from the mapping information server 1415 for the historical route data, the vehicle information server 1410 uses the GUID to find the particular historical vehicle status data in the temporary storage location and sends the particular historical vehicle status data to the mapping information server 1415. The mapping information server 1415 then calculates a most likely route based on the received historical vehicle status data (for example, as described in more detail above in conjunction with the various route calculation processes) and sends the calculated route data to the route construction and display module 1405, which outputs a virtual representation (e.g., a route highlight) of the final calculated route for display on the map display portion 116 of the vehicle management user interface 114. The final calculated route tracks actual road segments on the road map.

In certain embodiments, the vehicle information server 1410 sends the historical vehicle status data to the mapping information server 1415 and the mapping information server 1415 generates the calculated route data and sends it back to the vehicle information server 1419, thereby eliminating the need for GUIDs or for historical vehicle status data to be stored temporarily on the vehicle information server 1410.

VI. Terminology

As used herein, the term "road," in addition to having its ordinary meaning, can include, among other things, a street, a highway, a freeway, a toll road, a turnpike, an arterial road, a frontage road, an on-ramp, an off-ramp, a city street, a surface street, a residential street, a dirt road, a parking lot, a driveway, an intersection, a traffic circle, a roundabout, a rotary, an alley, any path upon which a vehicle can travel, combinations of the same, or the like. Further, although this specification refers primarily to roads for automobiles, trucks, and the like, the techniques described herein can also be applied to paths traveled by other vehicles, such as railroads, flight paths, and waterways.

Many variations other than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together. Execution in a cloud computing environment in some embodiments supports a multiplicity of conditions to be computed contemporaneously.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. For example, the vehicle management system 110 or 210 can be implemented by one or more computer systems or by a computer system including one or more processors. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system for determining and presenting an estimated route traveled by a fleet vehicle based on historical vehicle status data for the fleet vehicle at a plurality of time instances, the system comprising:

a computer system comprising computer hardware configured to at least:

generate a vehicle management user interface comprising a virtual road map depicting a plurality of roads in a geographic area;

output the vehicle management user interface for presentation on a display to a manager of a vehicle fleet;

receive a selection by the manager of data representing a vehicle of the vehicle fleet from the vehicle management user interface;

in response to receiving the selection, obtain telematics data for vehicle for a plurality of time instances within a time period of travel by the vehicle on the plurality of roads, the telematics data comprising vehicle position data denoting positions of the vehicle at the plurality of time instances, at least some of the plurality of time instances being separated from any other of the plurality of time instances by at least a time interval of a magnitude that creates ambiguity as to where the vehicle traveled during the time interval due to a presence of different roads of the plurality of roads between a beginning position of the vehicle at a start of the time interval and a final position of the vehicle at an end of the time interval;

identify estimated vehicle position locations for the vehicle on the plurality of roads at the plurality of time instances using the telematics data;

identify benchmark locations and non-benchmark locations from the estimated vehicle position locations, the benchmark locations having a higher probability of accurately reflecting actual locations of the vehicle on an actual route traveled by the vehicle on the plurality of roads within the time period of travel than the non-benchmark locations;

calculate a first plurality of routes on the plurality of roads, each route of the first plurality of routes connecting a first benchmark location of the benchmark locations and a first non-benchmark location of the non-benchmark locations, the first benchmark location corresponding to a first time instance of the plurality of time instances and the first non-benchmark location corresponding to a second time instance of the plurality of time instances that occurs after the first time instance, the first time instance and the second time instance being consecutive time instances of the plurality of time instances;

calculate a second plurality of routes on the plurality of roads, each route of the second plurality of routes connecting a second non-benchmark location of the non-benchmark locations and a second benchmark location of the benchmark locations, the second non-benchmark location corresponding to a third time instance of the plurality of time instances and the second benchmark location corresponding to a fourth time instance of the plurality of time instances that occurs after the third time instance, the third time instance and the fourth time instance being consecutive time instances of the plurality of time instances and occurring after the first time instance and the second time instance;

based at least on costs associated with individual routes of the first plurality of routes and the second plurality of routes, select one route of the first plurality of routes and one route of the second plurality of routes to each form part of a route segment connecting the first benchmark location and second benchmark location on the plurality of roads;

assign the route segment to be part of an estimated route traveled by the vehicle on the plurality of roads; and output a representation of the estimated route for presentation on the virtual road map to the manager.

2. The system of claim 1, wherein the computer system is further configured to output the representation of the estimated route with an arrow symbol reflecting a direction of travel of the vehicle along the estimated route.

3. The system of claim 1, wherein the computer system is further configured to output the representation of the estimated route with an indicator denoting a confidence level that the estimated route reflects the actual route.

4. The system of claim 3, wherein the indicator varies along the estimated route depending on the confidence level at various portions of the estimated route.

5. The system of claim 3, wherein the indicator comprises at least one of a coloring, an alphanumeric text, and a graphical icon.

6. The system of claim 1, wherein the plurality of time instances that are both after the first time instance and before the fourth time instance correspond to the non-benchmark locations rather than the benchmark locations.

7. The system of claim 1, wherein the computer system is configured to select the one route of the first plurality of routes and the one route of the second plurality of routes due to the one route of the first plurality of routes and the one route of the second plurality of routes being part of a lowest cost of group of routes that connect the first benchmark location and second benchmark location on the plurality of roads.

8. The system of claim 1, wherein the costs associated with the individual routes depend at least on weighting the individual routes according to a preference for at least one of (i)

routing the vehicle in a shortest distance, (ii) routing the vehicle in a fastest time, and (iii) routing the vehicle using a least amount of energy.

9. Non-transitory physical computer storage comprising instructions stored thereon for implementing, in one or more processors, a method for determining and presenting an estimated route traveled by a fleet vehicle based on historical vehicle status data for the fleet vehicle at a plurality of time instances, the method comprising:
    generating a vehicle management user interface comprising a virtual road map depicting a plurality of roads in a geographic area;
    outputting the vehicle management user interface for presentation on a display to a manager of a vehicle fleet;
    receiving a selection by the manager of data representing a vehicle of the vehicle fleet from the vehicle management user interface;
    in response to receiving the selection, obtaining telematics data for the vehicle for a plurality of time instances within a time period of travel by the vehicle on the plurality of roads, the telematics data comprising vehicle position data denoting positions of the vehicle at the plurality of time instances, at least some of the plurality of time instances being separated from any other of the plurality of time instances by at least a time interval of a magnitude that creates ambiguity as to where the vehicle traveled during the time interval due to a presence of different roads of the plurality of roads between a beginning position of the vehicle at a start of the time interval and a final position of the vehicle at an end of the time interval;
    identifying estimated vehicle position locations for the vehicle on the plurality of roads at the plurality of time instances using the telematics data;
    identifying benchmark locations and non-benchmark locations from the estimated vehicle position locations, the benchmark locations having a higher probability of accurately reflecting actual locations of the vehicle on an actual route traveled by the vehicle on the plurality of roads within the time period of travel than the non-benchmark locations;
    calculating a first plurality of routes on the plurality of roads, each route of the first plurality of routes connecting a first benchmark location of the benchmark locations and a first non-benchmark location of the non-benchmark locations, the first benchmark location corresponding to a first time instance of the plurality of time instances and the first non-benchmark location corresponding to a second time instance of the plurality of time instances that occurs after the first time instance, the first time instance and the second time instance being consecutive time instances of the plurality of time instances;
    calculating a second plurality of routes on the plurality of roads, each route of the second plurality of routes connecting a second non-benchmark location of the non-benchmark locations and a second benchmark location of the benchmark locations, the second non-benchmark location corresponding to a third time instance of the plurality of time instances and the second benchmark location corresponding to a fourth time instance of the plurality of time instances that occurs after the third time instance, the third time instance and the fourth time instance being consecutive time instances of the plurality of time instances and occurring after the first time instance and the second time instance;
    based at least on costs associated with individual routes of the first plurality of routes and the second plurality of routes, selecting one route of the first plurality of routes and one route of the second plurality of routes to each form part of a route segment connecting the first benchmark location and second benchmark location on the plurality of roads;
    assigning the route segment to be part of an estimated route traveled by the vehicle on the plurality of roads; and
    outputting a representation of the estimated route for presentation on the virtual road map to the manager.

10. The non-transitory physical computer storage of claim 9, wherein the plurality of time instances that are both after the first time instance and before the fourth time instance correspond to the non-benchmark locations rather than the benchmark locations.

11. The non-transitory physical computer storage of claim 9, wherein the costs associated with the individual routes depend at least on weighting the individual routes according to a preference for routing the vehicle in a shortest distance.

12. The non-transitory physical computer storage of claim 9, wherein the costs associated with the individual routes depend at least on weighting the individual routes according to a preference for routing the vehicle in a fastest time.

13. The non-transitory physical computer storage of claim 9, wherein the costs associated with the individual routes depend at least on weighting the individual routes according to a preference for routing the vehicle using a least amount of energy.

14. The non-transitory physical computer storage of claim 9, wherein the method further comprises comparing the estimated route to an assigned route for the vehicle on the plurality of roads to identify deviations from the assigned route.

15. The non-transitory physical computer storage of claim 9, wherein said selecting the one route of the first plurality of routes comprises selecting the one route of the first plurality of routes based at least on route data for a past route traveled on the plurality of roads other than the actual route.

16. The non-transitory physical computer storage of claim 9, wherein said selecting the one route of the first plurality of routes comprises selecting the one route of the first plurality of routes based at least on data about a driver of the vehicle.

17. The non-transitory physical computer storage of claim 9, wherein the method further comprises generating an alert for the manager based at least on the estimated route.

18. The non-transitory physical computer storage of claim 9, wherein said selecting the one route of the first plurality of routes and the one route of the second plurality of routes comprises selecting the one route of the first plurality of routes and the one route of the second plurality of routes so that a total cost associated with the routes of the route segment is minimized.

19. The non-transitory physical computer storage of claim 9, wherein said selecting the one route of the first plurality of routes and the one route of the second plurality of routes comprises selecting the one route of the first plurality of routes and the one route of the second plurality of routes due to the one route of the first plurality of routes and the one route of the second plurality of routes being part of a lowest cost of group of routes that connect the first benchmark location and second benchmark location on the plurality of roads.

20. The non-transitory physical computer storage of claim 9, wherein said identifying the benchmark locations comprises identifying a first position location of the estimated vehicle position locations as one of the benchmark locations in response to determining that a distance between the first position location and a second position location of the estimated vehicle position locations is less than a threshold distance, the first position location and the second position location corresponding to consecutive time instances of the plurality of time instances.

21. The non-transitory physical computer storage of claim 9, wherein said identifying the benchmark locations comprises identifying a position location of the estimated vehicle position locations as one of the benchmark locations in response to determining that the position location is likely on only one road of the plurality of roads within a threshold probability.

22. The non-transitory physical computer storage of claim 9, wherein the vehicle position data comprises global positioning system (GPS) data output by an in-vehicle GPS device within the vehicle.

23. The non-transitory physical computer storage of claim 9, wherein said generating the vehicle management user interface comprises generating the vehicle management user interface to further comprise a vehicle history timeline, the vehicle history timeline comprising a first timeline including status data for the vehicle.

24. The non-transitory physical computer storage of claim 9, wherein the vehicle history timeline comprises a second timeline including status data for another vehicle of the vehicle fleet other than the vehicle, and wherein said outputting the vehicle management user interface comprises outputting the first timeline and the second timeline for presentation together on a common time scale in the vehicle management user interface.

* * * * *

UNITED STATES PATENT AND TRADEMARK OFFICE
CERTIFICATE OF CORRECTION

| | | |
|---|---|---|
| PATENT NO. | : 9,140,567 B2 | Page 1 of 1 |
| APPLICATION NO. | : 13/411186 | |
| DATED | : September 22, 2015 | |
| INVENTOR(S) | : Fryer et al. | |

It is certified that error appears in the above-identified patent and that said Letters Patent is hereby corrected as shown below:

In the Claims

In column 23 at line 45, In Claim 1, after "data for" insert --the--.

Signed and Sealed this
Tenth Day of May, 2016

Michelle K. Lee
*Director of the United States Patent and Trademark Office*